(12) United States Patent
Ke et al.

(10) Patent No.: US 11,314,803 B2
(45) Date of Patent: Apr. 26, 2022

(54) METHOD FOR IMAGE-PROCESSING AND MOBILE TERMINAL

(71) Applicant: GUANGDONG OPPO MOBILE TELECOMMUNICATIONS CORP., LTD., Guangdong (CN)

(72) Inventors: Xiuhua Ke, Guangdong (CN); Wei Cao, Guangdong (CN); Jun Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 267 days.

(21) Appl. No.: 16/818,509

(22) Filed: Mar. 13, 2020

(65) Prior Publication Data
US 2020/0218755 A1    Jul. 9, 2020

Related U.S. Application Data

(63) Continuation of application No. PCT/CN2017/101948, filed on Sep. 15, 2017.

(51) Int. Cl.
*G06F 16/55* (2019.01)
*G06F 16/583* (2019.01)
(Continued)

(52) U.S. Cl.
CPC ............ *G06F 16/55* (2019.01); *G06F 16/583* (2019.01); *G06F 16/5866* (2019.01);
(Continued)

(58) Field of Classification Search
CPC .... G06F 16/55; G06F 16/583; G06F 16/5866; G06K 2009/00328; G06K 9/00261; G06K 9/00288; G06K 9/62
See application file for complete search history.

(56) References Cited

U.S. PATENT DOCUMENTS

| | | | |
|---|---|---|---|
| 2009/0196510 A1* | 8/2009 | Gokturk | G06F 16/5846 382/224 |
| 2013/0195375 A1 | 8/2013 | Anbalagan et al. | |
| 2017/0154209 A1 | 6/2017 | Nakano et al. | |

FOREIGN PATENT DOCUMENTS

| | | |
|---|---|---|
| CN | 101965578 A | 2/2011 |
| CN | 103207870 A | 7/2013 |

(Continued)

OTHER PUBLICATIONS

European Search Report and Written Opinion for related European Application No. 17925288.7, dated Aug. 20, 2020 (9 pages).
(Continued)

*Primary Examiner* — Manuchehr Rahmjoo
(74) *Attorney, Agent, or Firm* — Young Basile Hanlon & MacFarlane, P.C.

(57) ABSTRACT

A method for image-processing is disclosed. The method includes obtaining first image-information of an image that is to be clustered in response to a first preset condition being met; clustering the image according to the first image-information and obtaining a first clustering-result; sending an image-clustering request to a server in response to a second preset condition being met, wherein the image-clustering request is configured to indicate the server to cluster the image which has been uploaded to the server and obtain a second clustering-result; and receiving the second clustering-result returned from the first server and updating at least one of the first clustering-result and the second clustering-result according to a preset rule.

19 Claims, 11 Drawing Sheets

(51) Int. Cl.
*G06F 16/58* (2019.01)
*G06V 40/16* (2022.01)

(52) U.S. Cl.
CPC .......... *G06V 40/167* (2022.01); *G06V 40/172* (2022.01); *G06V 40/179* (2022.01)

(56) References Cited

FOREIGN PATENT DOCUMENTS

| | | |
|---|---|---|
| CN | 106055554 A | 10/2016 |
| CN | 106156347 A | 11/2016 |
| CN | 106777007 A | 5/2017 |

OTHER PUBLICATIONS

International Search Report and Written Opinion for related International Application No. PCT/CN2017/101948, dated Jun. 13, 2018 (3 pages).
Extended European Search Report for EP Application 17925288.7 dated Sep. 10, 2021. (8 pages).

\* cited by examiner

METHOD FOR IMAGE-PROCESSING AND MOBILE TERMINAL

CROSS-REFERENCE TO RELATED APPLICATION(S)

This application is a continuation application of International Patent Application No. PCT/CN2017/101948, filed on Sep. 15, 2017, the content of which is herein incorporated by reference in its entirety.

TECHNICAL FIELD

The present disclosure generally relates to the field of computers, and in particular, to a method image-processing and a mobile terminal.

BACKGROUND

With the rapid development of Internet technology, users can store a large number of pictures in mobile terminals. In order to facilitate users to search stored pictures, pictures can be classified. In the conventional method, users usually need to manually add tags for the pictures stored on the mobile terminal, and then the pictures are put into different albums in the mobile terminal and displayed according to the tags. These are burdensome operations.

SUMMARY

According to one aspect of the present disclosure, a method for image-processing is provided, including obtaining first image-information of an image that is to be clustered in response to a first preset condition being met; clustering the image according to the first image-information and obtaining a first clustering-result; sending an image-clustering request to a server in response to a second preset condition being met, wherein the image-clustering request is configured to indicate the server to cluster the image which has been uploaded to the server and obtain a second clustering-result; and receiving the second clustering-result returned from the first server and updating at least one of the first clustering-result and the second clustering-result according to a preset rule.

According to another aspect of the present disclosure, a method for image-processing is provided, including receiving an image-clustering request sent by a mobile terminal, wherein the image-clustering request is sent by the mobile terminal in response to a first preset condition being met; clustering an image which has been uploaded by the mobile terminal and obtaining a second clustering-result in response to the image-clustering request; and sending the second clustering-result to the mobile terminal, wherein the second clustering-result is configured for the mobile terminal to update at least one of a first clustering-result and the second clustering-result according to a preset rule, wherein the first clustering-result is obtained from the mobile terminal clustering the image that is to be clustered in response to a first preset condition being met.

According to yet another aspect of the present disclosure, a mobile terminal is provided, including a non-transitory memory storing executable instructions, and a processor, wherein the executable instructions, when executed, causes the processor to perform: obtaining first image-information of an image that is to be clustered in response to a first preset condition being met; clustering the image according to the first image-information and obtaining a first clustering-result; sending an image-clustering request to a server in response to a second preset condition being met, wherein the image-clustering request is configured to indicate the server to cluster the image which has been uploaded to the server and obtain a second clustering-result; and receiving the second clustering-result returned from the first server and updating at least one of the first clustering-result and the second clustering-result according to a preset rule.

Details of one or more embodiments of the present disclosure are set forth in the accompanying drawings and description below. Other features, objects, and advantages of the present disclosure will become apparent from the description, the drawings, and the claims.

BRIEF DESCRIPTION OF DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
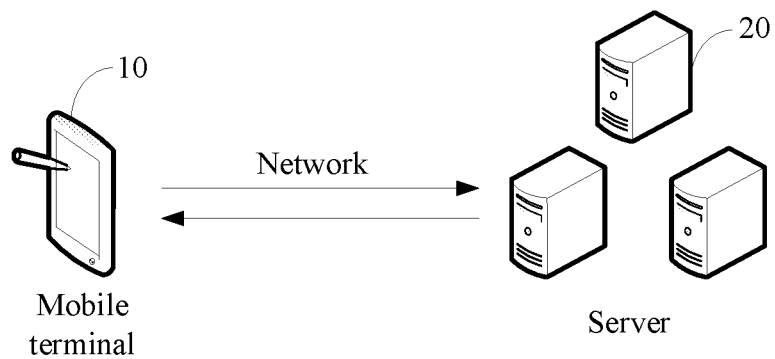
FIG. 1 is an application scene of a method for image-processing according to some embodiments.

In order to make objects, technical solutions, and advantages of the present disclosure clearer, the present disclosure is further described in detail with the accompanying drawings and the following embodiments. It is understood that the specific embodiments described herein are merely illustrative of the present disclosure, and not intended to limit the present disclosure.

It will be understood that the terms "first", "second" and the like, as used herein, may be used to describe various elements, but these elements are not limited by these terms. These terms are only used to distinguish one element from another. By way of example, without departing from the scope of the present disclosure, a first client terminal may be called as a second client terminal, and similarly, the second client terminal can be called as the first client terminal. Both the first client terminal and the second client terminal are client terminals, but not a same client terminal.

A method for image-processing is provided, including obtaining first image-information of an image that is to be clustered in response to a first preset condition being met; clustering the image according to the first image-information and obtaining a first clustering-result; sending an image-clustering request to a server in response to a second preset condition being met, wherein the image-clustering request is configured to indicate the server to cluster the image which has been uploaded to the server and obtain a second clustering-result; and receiving the second clustering-result returned from the first server and updating at least one of the first clustering-result and the second clustering-result according to a preset rule.

In some embodiments, the image is from at least one of a new image list and an updating image list, wherein the new image list includes an image for which face-recognition is not performed, and the updating image list includes an image for which face-recognition is performed and having a content varied after the face recognition.

In some embodiments, a similarity between a first feature and a second feature of a first image being less than a preset value indicates that the first image has a content varied after the face recognition, wherein the second feature is obtained as the first image is recognized, and the first feature is obtained as the first image is re-recognized.

In some embodiments, a first image is performed image-recognition, and the first image has a modification time inconsistent with that of the recognized first image and a message digest inconsistent with that of the recognized first image, and the first image is determined to have a content varied after the face recognition.

In some embodiments, before the sending an image-clustering request to the server, the method further includes obtaining an idle server list from a registration server every preset time period; obtaining a first server that is idle from the idle server list in response to the idle server list being not empty; and uploading the image and sending an image-recognition request to the first server, wherein the image-recognition request indicates the first server to perform image-recognition for the image received by the first server and extract a feature of the image.

In some embodiments, the sending an image-clustering request to the server includes: sending the image-clustering request to a second server in response to a completing-receiving instruction returned from the first server, wherein the completing-receiving instruction indicates that the first server has received the image, and the image-clustering request is configured to indicate the second server to cluster the feature of the image which has been uploaded to the first server via a preset model, and determine a group of the image and assign a corresponding group tag, wherein the feature of the image is uploaded from the first server to the second server.

In some embodiments, the sending an image-clustering request to the server includes: acquiring current image-grouping information and features of grouped images of each group corresponding to the image-grouping information; acquiring second image-information of the image which has been uploaded to the first server; packaging the image-grouping information, the features of the grouped images of each group, and the second image-information into an uplink data packet; and sending the uplink data packet and the image-clustering request to the second server, wherein the image-clustering request is configured to indicate the second server to calculate a similarity between the feature of the image which has been uploaded to the first server and each of the features of the grouped images of each group via a preset model, and determine a group of the image and assign a corresponding group tag.

In some embodiments, the first clustering-result includes a first image identifier of the image, and the second clustering-result includes a second image identifier of the image; the updating at least one of the first clustering-result and the second clustering-result according to a preset rule includes: determining that the first image identifier is inconsistent with the second image identifier in response to the first clustering-result being inconsistent with the second clustering-result; updating the second cluster result according to the first clustering-result having the first image identifier in response to the first image identifier being resulted from manually-grouping; and updating the first cluster result according to the second clustering-result having the second image identifier in response to the first image identifier not being resulted from manually-grouping.

In some embodiments, the first clustering-result includes an image identifier of the image and a first group tag corresponding to the image identifier, and the second clustering-result includes the image identifier of the image and a second group tag corresponding to the image identifier; the updating at least one of the first clustering-result and the second clustering-result according to a preset rule includes: determining a grouping type of the first group tag in response to the first group tag being inconsistent with the second group tag; remaining the first group tag in response to the grouping type being manually-grouping; and updating the first group tag to the second group tag in response to the grouping type being not manually-grouping.

In some embodiments, the first clustering-result includes an image identifier of the image and first face-information corresponding to the image identifier, and the second clustering-result includes the image identifier of the image and second face-information corresponding to the image identifier; the updating at least one of the first clustering-result and the second clustering-result according to a preset rule includes: comparing the first face-information with the second face-information; updating the first face-information to the second face-information in response to the first face-information being less than the second face-information; determining a grouping type of an extra portion of the first face-information in response to the first face-information being more than the second face-information; and remaining the extra portion of the first face-information in response to the grouping type being manually-grouping, and hiding the extra portion of the first face-information in response to the grouping type being not manually-grouping.

In some embodiments, the updating at least one of the first clustering-result and the second clustering-result according to a preset rule further includes: sending the extra portion of the first face-information and the image identifier to the server for storage in response to the grouping type being manually-grouping.

A method for image-processing is provided, including receiving an image-clustering request sent by a mobile terminal, wherein the image-clustering request is sent by the mobile terminal in response to a first preset condition being met; clustering an image which has been uploaded by the mobile terminal and obtaining a second clustering-result in response to the image-clustering request; and sending the second clustering-result to the mobile terminal, wherein the second clustering-result is configured for the mobile terminal to update at least one of a first clustering-result and the second clustering-result according to a preset rule, wherein the first clustering-result is obtained from the mobile terminal clustering the image that is to be clustered in response to a first preset condition being met.

In some embodiments, the image-clustering request includes an identifier of the mobile terminal and a time point at which the image-clustering request is sent. After the receiving an image-clustering request sent by a mobile terminal, the method further includes: detecting whether another image-clustering request including the identifier of the mobile terminal exists in the request queue, wherein the request queue is arranged in order of time points at which image-clustering requests are sent by mobile terminals; and merging the another image-clustering request with the image-clustering request in response to the another image-clustering request existing in the request queue.

In some embodiments, the image-clustering request includes account information and a time point at which the image-clustering request is sent. After the receiving an image-clustering request sent by a mobile terminal, the method further includes: detecting whether another image-clustering request including the account information exists in the request queue, wherein the request queue is arranged in order of time points at which image-clustering requests are sent by mobile terminals; and merging the another image-clustering request with the image-clustering request in response to the another image-clustering request existing in the request queue.

In some embodiments, the clustering an image which has been uploaded by the mobile terminal and obtaining a second clustering-result in response to the image-clustering request includes: obtaining a feature of the image; and clustering the image according to the feature of the image via a preset model, determining a group of the image, and assigning a corresponding group tag.

A mobile terminal is provided, including a non-transitory memory storing executable instructions, and a processor, wherein the executable instructions, when executed, causes the processor to perform: obtaining first image-information of an image that is to be clustered in response to a first preset condition being met; clustering the image according to the first image-information and obtaining a first clustering-result; sending an image-clustering request to a server in response to a second preset condition being met, wherein the image-clustering request is configured to indicate the server to cluster the image which has been uploaded to the server and obtain a second clustering-result; and receiving the second clustering-result returned from the first server and updating at least one of the first clustering-result and the second clustering-result according to a preset rule.

In some embodiments, the image is from at least one of a new image list and an updating image list, wherein the new image list includes an image for which face recognition is not performed, and the updating image list includes an image for which face recognition is performed and having a content varied after the face recognition.

In some embodiments, a similarity between a first feature and a second feature of a first image being less than a preset value indicates that the first image has a content varied after the face recognition, wherein the second feature is obtained as the first image is recognized, and the first feature is obtained as the first image is re-recognized.

In some embodiments, a first image is performed recognition, and the first image has a modification time inconsistent with that of the recognized first image and a message digest inconsistent with that of the recognized first image, and the first image is determined to have a content varied after the face recognition.

In some embodiments, the image is performed image-recognition by another server to extract a feature of the image, and the image-clustering request is configured to indicate the server to cluster the image according to the feature of the image via a preset model, and determine a group of the image and assign a corresponding group tag, wherein the feature of the image is uploaded from the another server to the server.

FIG. 1 is an application scenario of a method for image-processing according to some embodiments. As shown in FIG. 1, a mobile terminal 10 may establish a communication connection with a server 20 through a network. The server 20 means a single server, a server cluster including multiple servers, or one server of the server cluster. When a first preset condition is met, the mobile terminal 10 obtains first image-information of an image that is to be clustered, clusters the an image that is to be clustered according to the first image-information, and obtains a first clustering-result. When the mobile terminal 10 meets a second preset condition, it sends an image-clustering request to the server 20. The server 20 receives the image-clustering request sent from the mobile terminal 10, clusters the image which has been uploaded to the server 20 from the mobile terminal 10 according to the image clustering-request, and obtains a second clustering-result. The server 20 sends the second clustering-result to the mobile terminal 10. The mobile terminal 10 receives the second clustering-result returned from the server 20, and updates at least one of the first clustering-result and the second clustering-result according to a preset rule.

Figure 2:
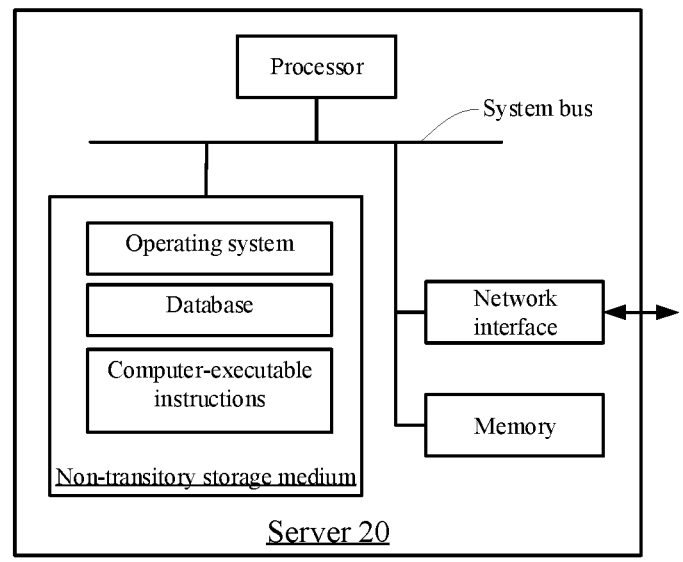
FIG. 2 is a diagram of a server according to some embodiments.

FIG. 2 is a block diagram of the server 20 according to some embodiments. As shown in FIG. 2, the server 20 includes a processor, a non-transitory storage medium, a memory, and a network interface, which are connected with a system bus. The non-transitory storage medium of the server 20 stores an operating system, a database, and computer-executable instructions. The database stores images have been uploaded from the mobile terminal, extracted features, and the like. The computer-executable instructions are configured to implement a method for image-processing according to embodiments of the present disclosure. The processor of the server 20 is configured to have computing and control capabilities and support operations of the entire server 20. The memory of the server 20 provides a high-speed running environment for the operating system and computer-executable instructions in the non-transitory storage medium. The network interface of the server 20 is used to communicate with an external mobile terminal through a network connection, such as receiving images uploaded from the mobile terminal, receiving image-clustering requests sent from the mobile terminal, and the like. The server 20 can be implemented as an independent server or a server cluster including multiple servers. Those skilled in the art can understand that, what shown in FIG. 2 is only a block diagram of a part of a structure related to the solution of the present disclosure, and does not constitute a limitation on the server 20 to which the solution of the present disclosure is applied. Specifically, the server 20 may include more or fewer components than what shown in the figure, combine with some of the components, or have a different arrangement.

Figure 3:
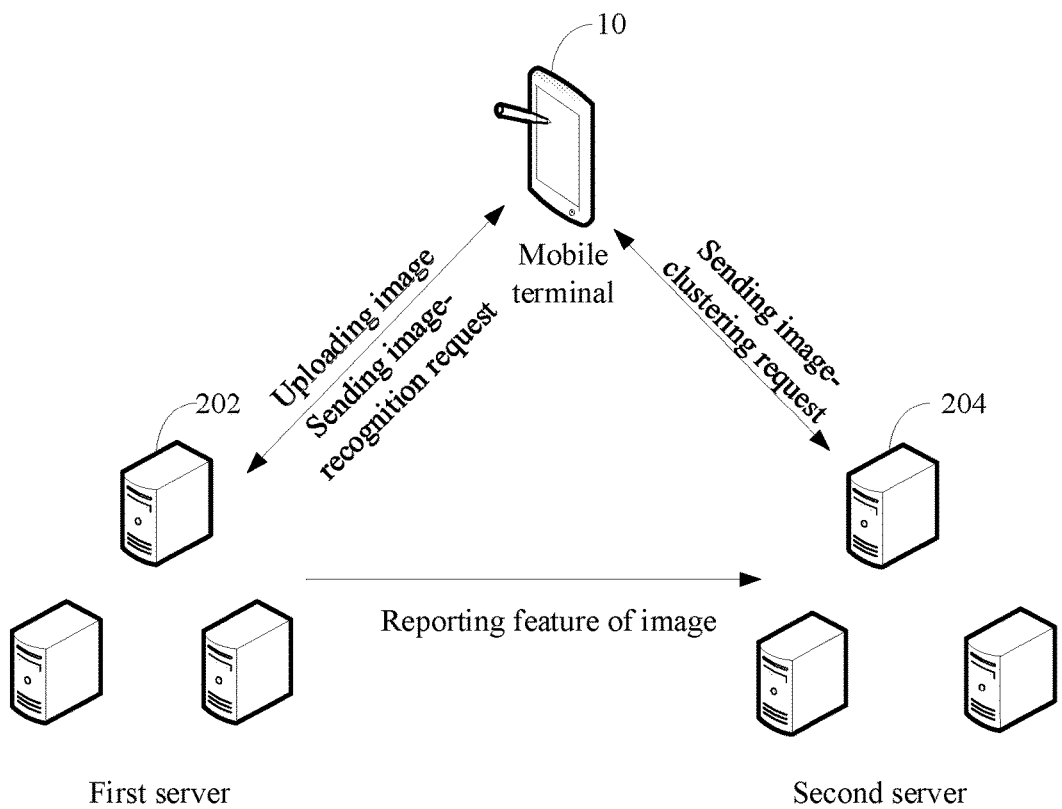
FIG. 3 is an application scene of a method for image-processing according to another some embodiments.

FIG. 3 is an application scenario of a method for image-processing according to another some embodiments. As shown in FIG. 3, the mobile terminal 10 may establish a respective communication connection with a first server 202 and a second server 204 through a network. The first server 202 means a single server, a server cluster including multiple servers, or one server of the server cluster. The second server 204 means a single server, a server cluster including multiple servers, or one server of the server cluster. When the first preset condition is met, the mobile terminal 10 acquires first image-information of an image that is to be clustered, and clusters the image that is to be clustered according to the first image-information and obtains a first clustering-result. When a second preset condition is met, the mobile terminal uploads the image to the server 202 and sends an image-recognition request to the first server 202. The first server 202 receives the image-recognition request sent from the mobile terminal 10, recognizes the received image according to the image-recognition request, and extracts a feature of the received image. The first server 202 uploads the extracted feature of the image to the second server 204. When receiving a completing-receiving instruction returned from the first server 202, the mobile terminal 10 sends an image-clustering request to the second server 204 according to the completing-receiving instruction. That is, the mobile terminal 10 sends the image-clustering request in response to the completing-receiving instruction. The completing-receiving instruction indicates that the first server 202 has received the image. The second server 204 receives the image-clustering request sent from the mobile terminal 10, clusters the feature of the image that has been uploaded to the first server 202 by using a preset model in response to the image-clustering request, determines a group to which the image belongs and assigns a group tag corresponding to the group, and obtains a second clustering-result. The second server 204 sends the second clustering-result to the mobile terminal 10, and the mobile terminal 10 updates at least one of the first clustering-result and the second clustering-result according to a preset rule.

Figure 4:
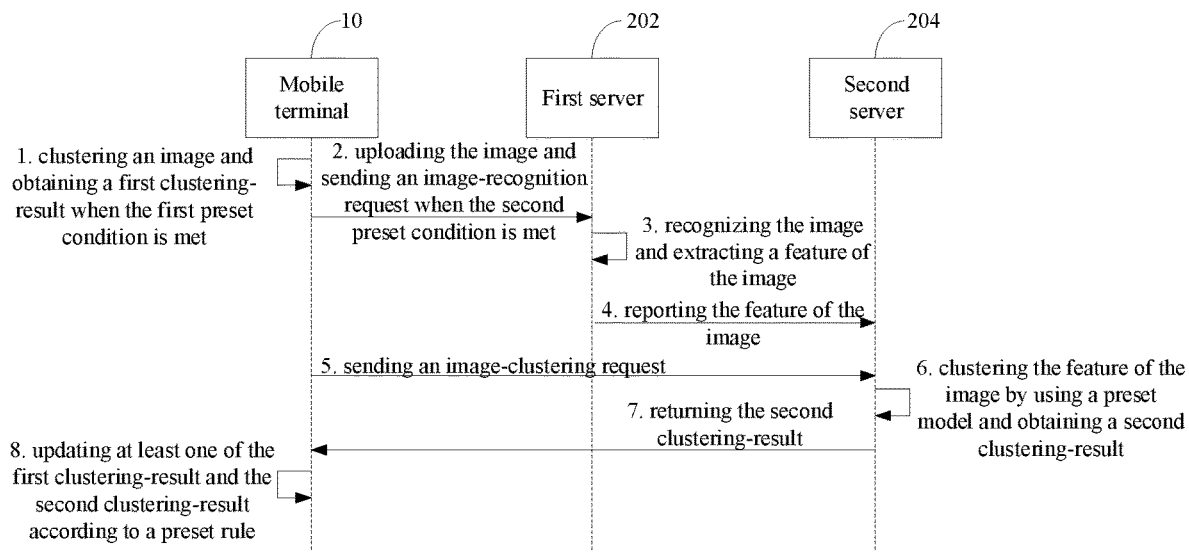
FIG. 4 is a timing diagram of interactions among a mobile terminal, a first server, and a second server.

FIG. 4 is a timing diagram of interactions among the mobile terminal, the first server, and the second server according to some embodiments. As shown in FIG. 4, the interaction process among the mobile terminal 10, the first server 202, and the second server 204 mainly include the following actions/operations.

1. When the first preset condition is met, the mobile terminal 10 clusters an image that is to be clustered and obtains a first clustering-result.

The mobile terminal 10 may preset the first preset condition for triggering to perform local image-clustering, and when the first preset condition is met, the mobile terminal 10 performs the local clustering for the image in the mobile terminal 10. In some embodiments, when the mobile terminal 10 meets the first preset condition, the image that is to be clustered may be determined by comparing the image-information stored in the first database with that in the second database. The first database includes a media database of the mobile terminal 10, and the second database includes a face database for storing face recognition results of images.

In some embodiments, the mobile terminal 10 may compare the image-information stored in the first database with the image-information stored in the second database, which may compare a storage path, a multimedia number, a modification time, or a message digest of an image, generates at least one of a new image list and an updating image list, and determines the image that is to be clustered according to the new image list and the updating image list. The new image list records images each of which is not performed face recognition in the mobile terminal 10, and the updating image list recodes images each of which is performed face recognition and have a content varied after the face recognition.

The mobile terminal 10 may obtain first image-information of the image that is to be clustered. The first image-information may include an image identifier and a storage path of the image, and the identifier may be a name or number of the image. The mobile terminal 10 may obtain the image that is to be clustered according to the first image-information, perform image-recognition on the image that is to be clustered, and extract a feature of the image that is to be clustered. After extracting the feature of the image that is to be clustered, the mobile terminal 10 clusters the feature of the image that is to be clustered by using a preset clustering model, partitioning the image that is to be clustered and another image having similar features into a same group, and determines the group to which the image that is to be clustered belongs, and obtain the first clustering-result.

2. When the second preset condition is met, the mobile terminal 10 uploads the image to the first server 202, and sends an image-recognition request.

The mobile terminal 10 may preset the second preset condition that triggers to perform server image-clustering. When the second preset condition is met, the mobile terminal 10 uploads one or more images to the first server 202. In some embodiments, the mobile terminal 10 obtains an idle server list from a registration server every preset time period, and reads address information of an idle first server 202 from the idle server list if the idle server list is not empty. The mobile terminal 10 may upload the image to the corresponding first server 202 according to the address information of the idle first server 202 read from the idle server list, and simultaneously send an image-recognition request. The image-recognition request may carry an identifier of the mobile terminal 10 that sends the request.

3. The first server 202 recognizes the image and extracts a feature of the image.

After receiving the image-recognition request and the image sent by the mobile terminal 10, the first server 202 may recognize the received image in response to the image-recognition request, and extract the feature of the image. In some embodiments, the first server 202 may encrypt the received image by using an encryption algorithm, and cache the encrypted image into a file queue. After reading cached intercepted image from the file queue, the first server 202 decrypts each of the read and decrypted image, recognizes the decrypted image according to a preset feature-recognition model, and extracts the feature of each image.

4. The first server 202 reports the feature of the image to the second server 204.

The first server 202 recognizes the image uploaded from the mobile terminal 10 and extracts the feature, and reports the feature of the image, corresponding image-information, and an identifier and account information of the mobile terminal to the second server 204.

5. The mobile terminal 10 sends an image-clustering request to the second server 204.

The mobile terminal 10 uploads one or more images to the first server 202. When having received the image, the first server 202 may send a completing-receiving instruction to the mobile terminal 10. When receiving the completing-receiving instruction returned by the first server 202, the mobile terminal 10 may send the image-clustering request to the second server 204 in response to the completing-receiving instruction, so as to request clustering the image uploaded to the first server 202. After the mobile terminal 10 sends the image-clustering request to the second server 204, the second server 204 may add the image-clustering request into a request queue and perform the image-clustering request according to the request queue.

In some embodiments, the second server 204 may merge image-clustering requests that the same mobile terminal sends at different time points in the request queue, and may also merge image-clustering requests of a same account in the request queue.

6. The second server 204 clusters the feature of the image by using a preset model and obtains a second clustering-result.

After receiving the image-clustering request, the second server 204 obtains the feature of the image corresponding to the image-clustering request according to information of the mobile terminal 10 such as the identifier and account information thereof, and clusters the feature corresponding to the image-clustering request according to the preset model. The second server 204 partitions the image and another image containing similar features into a group, and determines the group of each image and assigns a corresponding group tag, so as to obtain the second clustering-result.

7. The second server 204 returns the second clustering-result to the mobile terminal 10.

8. The mobile terminal 10 updates at least one of the first clustering-result and the second clustering-result according to a preset rule.

The mobile terminal 10 may receive the second clustering-result returned by the second server 204, and the mobile terminal 10 may compare the first clustering-result with the second clustering-result. The first clustering-result may include a first image identifier, a first group tag, and first face-information of the image. The second clustering-result may include a second image identifier, a second group tag, and second face-information of the image. When the first clustering-result is different from the second clustering-result, at least one of the first clustering-result and the second clustering-result may be updated according to the preset rule.

In some embodiments, when the first clustering-result is inconsistent with the second clustering-result, the mobile terminal 10 may determine that the first image identifier of the image is inconsistent with the second image identifier for the image, and determine whether the first image identifier inconsistent with the second image identifier is resulted from manually-grouping. When the first image identifier inconsistent with the second image identifier is resulted from manually-grouping, the mobile terminal 10 may adopt local clustering, and update the second clustering-result according to the first clustering-result having the first image identifier inconsistent with the second image identifier. When the first image identifier inconsistent with the second image identifier is not resulted from manually-grouping, the mobile terminal 10 may adopt server clustering, and update the first clustering-result according to the second clustering-result having the second image identifier inconsistent with the first image identifier.

In some embodiments, when the first group tag corresponding to the first image identifier is inconsistent with the second group tag corresponding to the second image identifier and the first image identifier is same with the second image identifier, the mobile terminal 10 may determine a grouping type for the first group tag corresponding to the image identifier. The mobile terminal remains the first group tag corresponding to the first image identifier when the grouping type is manually-grouping, and updates the first group tag corresponding to the first image identifier to the second group tag when the grouping type is not manually-grouping.

In some embodiments, the mobile terminal 10 may compare the first face-information corresponding to the first image identifier with the second face-information corresponding to the second image identifier and the first image identifier is same with the second image identifier. The mobile terminal 10 updates the first face-information corresponding to the first image identifier to the second face-information when the first face-information corresponding to the first image identifier is less than the second face-information corresponding to the second image identifier, and the mobile terminal 10 may determine a grouping type of an extra portion of the first face-information when the first face-information corresponding to the first image identifier is more than the second face-information corresponding to the second image identifier. The mobile terminal 10 may remain the extra portion of the first face-information when the grouping type is manually-grouping, and the mobile terminal 10 may hide the extra portion of the first face-information when the grouping type is not manually-grouping.

Figure 5:
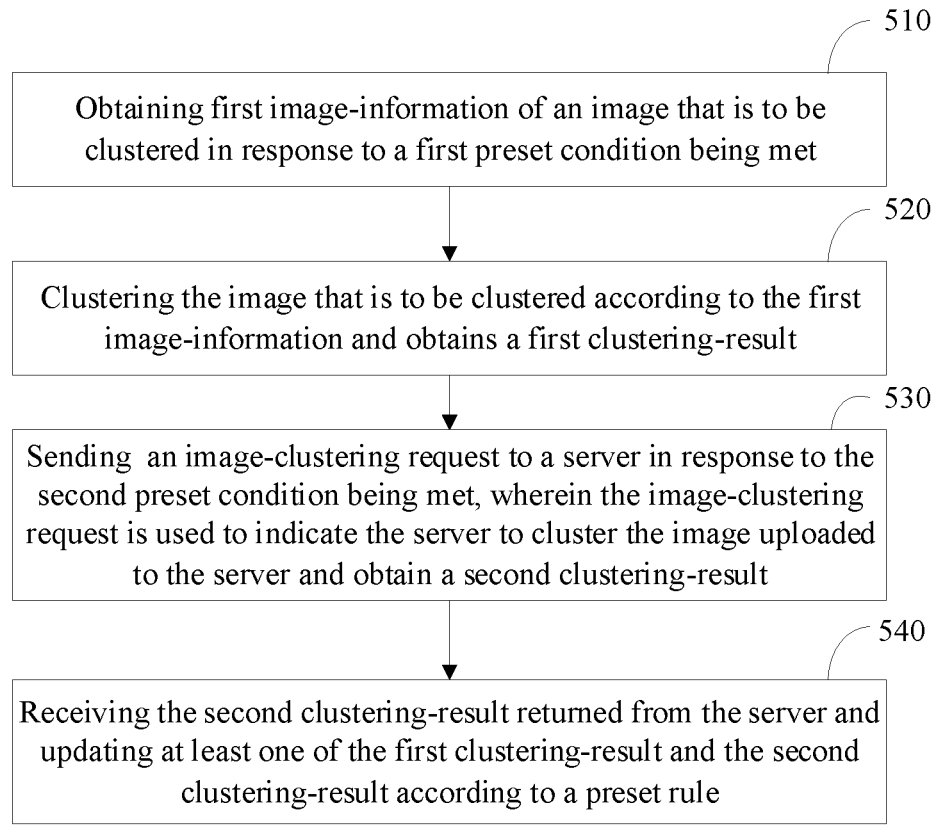
FIG. 5 is a flow chart of a method for image-processing according to some embodiments.

As shown in FIG. 5, in some embodiments, a method for image-processing is provided, which is executed by a mobile terminal and including actions/operations at blocks 510-540.

At block 510, the method obtains first image-information of an image that is to be clustered in response to a first preset condition being met.

The mobile terminal may preset the first preset condition for triggering to perform local clustering, and when the first preset condition is met, the mobile terminal performs local clustering for images on the mobile terminal. In some embodiments, the first preset condition may be set according to actual needs. For example, when the feature-recognition model is updated in the mobile terminal, local clustering may be triggered. When a duration between the current time point of the mobile terminal and a previous time point at which local clustering is performed exceeds a preset duration, such as 48 hours, 72 hours, etc., local clustering may be triggered. When the mobile terminal detects that another image which is not clustered by a server since the server clusters images uploaded from the mobile terminal, local clustering may be triggered to cluster images which are not clustered by the server. However, this is not limited.

When the first preset condition is met, one or more to-be-clustered images may be selected in the mobile terminal. The image that is to be clustered may be an image captured by a user on the mobile terminal or an image acquired from other computers, such as an image sent by other mobile terminals, an image saved when the user browses a webpage via the mobile terminal, etc. In this embodiment, the image that is to be clustered may be a photo, and the mobile terminal may cluster the photo to generate a corresponding photo album. The mobile terminal may obtain first image-information of the image that is to be clustered. The first image-information may include information such as an image identifier and a storage path of the image, and the image identifier may be a name or number of the image.

In some embodiments, when different first preset conditions, different image that are to be clustered may be selected in the mobile terminal. For example, when the feature-recognition model in the mobile terminal is updated, the mobile terminal may obtain all images stored in the mobile terminal for performing a full clustering. When a duration between the current time of the mobile terminal and a previous time point at which local clustering exceeds a preset duration, the mobile terminal can obtain images that have not been clustered for performing an incremental clustering.

At block 520, the method clusters the image that is to be clustered according to the first image-information and obtains a first clustering-result.

The mobile terminal may obtain the image that is to be clustered according to the first image-information, perform image-recognition for the image that is to be clustered, and extract a feature of the image that is to be clustered. In some embodiments, the mobile terminal may perform face-recognition for the image that is to be clustered and extract the feature of the image that is to be clustered. The feature may include a shape feature, a spatial feature, an edge feature, etc. The shape feature means a local shape in the clustered image. The spatial feature refers to mutual spatial positions or relative orientation relationships among multiple regions segmented from the image that is to be clustered. The edge feature refers to boundary pixels located between two regions in the image that is to be clustered. The feature is not limited to include these ones, but may also include a color feature, a texture feature, and the like. Further, the mobile terminal may extract feature points, which can be used to describe the shape of the face and the shape and position of the facial features, from the image that is to be clustered according to a preset feature-recognition model.

In some embodiments, after acquiring the image that is to be clustered, the mobile terminal may first analyze the image that is to be clustered by using a preset face-recognition model to determine whether the image includes a face. In some embodiments, the face-recognition model may be a decision model pre-constructed through machine learning. When the face-recognition model is constructed, a large number of sample images may be obtained. The sample images include a face image and an unmanned image. The sample images are marked according to whether each sample image contains a face. The marked sample images are used as input of the face-recognition model, and are trained through machine learning to obtain the face-recognition model. Images that are to be clustered in the mobile terminal are divided into the unmanned images or face images, and then the unmanned images are correspondingly put into an unmanned-image group, and a corresponding group identifier is added. Features are extracted only from the face images in the mobile terminal, and the face images are clustered.

After the feature of the image that is to be clustered is extracted in the mobile terminal, the feature of the image that is to be clustered is clustered by using a preset model, and the image that is to be clustered and another image having similar feature are partitioned into a same group, and the group is determined for each image that is to be clustered. Thus, a first clustering-result is obtained. The first clustering-result includes an image identifier and a corresponding first group tag of each image that is to be clustered. A group tag is used to indicate a group to which an image belongs. Images that are to be clustered are partitioned into a respective group according to the first clustering-result in the mobile terminal, and images belonging to a same group are displayed in a same album.

In some embodiments, before the image that is to be clustered is clustered in the mobile terminal, current image-grouping information may be extracted. The image-grouping information includes group information of a respective group, such as a group identifier, a group name, and creating time, and also includes image-information contained in the respective group, such as an image identifier and a storage path of an image contained in the respective group. In some embodiments, the image-grouping information is expressed in a form of group_id: pic_id, wherein group_id represents a group identifier, and pic_id represents a multimedia number of an image. Features of grouped images in a respective group are extracted according to the image-grouping information in the mobile terminal, and then features of all images contained in a respective group are obtained. A similarity between the feature of the image that is to be clustered and a feature of a respective grouped image in a respective group is calculated in the mobile terminal via a clustering model. When the similarity between the feature of the image that is to be clustered and a feature of a respective grouped image in a respective group is greater than a first threshold, the image that is to be clustered and the grouped image are considered to belong to a same class, and the image that is to be clustered is partitioned into the group having a similarity greater than the first threshold. If there is no group having a similarity greater than the first threshold with the feature of the image that is to be clustered, it means that the image that is to be clustered does not belong to any one of the existed groups. The image that is to be clustered does not belong to any one of the existed groups and are re-clustered via a preset clustering model, and the image that is to be clustered and anther image having similar features are partitioned into a new group.

The local clustering in the mobile terminal does not depend on the network, which can improve the efficiency of image clustering.

At block 530, the method sends an image-clustering request to a server in response to the second preset condition being met. The image-clustering request is used to indicate the server to cluster the image uploaded to the server and obtain a second clustering-result.

The mobile terminal can preset a second preset condition for triggering server clustering. When the second preset condition is met, the mobile terminal can send an image-clustering request to the server, so that the server clusters the uploaded images. In some embodiments, the second preset condition may be set according to actual requirements. For example, when a duration between the current time point in the mobile terminal and a previous time point at which the server was requested to perform image-clustering exceeds a preset duration, such as 48 hours, 72 hours, etc., an image-clustering request is sent to the server. When a power status of the mobile terminal meets a preset status, an image-clustering request is sent to the server, where the power status can include available remaining power, whether a power is in a charging state or not, power consumption speed, etc. The preset status can be that the available remaining power is greater than a preset percentage, being in a charging state, or the available remaining power is greater than a preset percentage and the power consumption speed is less than a set value, etc., which is not limited. When the current time point is in a preset clustering time period such as a time period from 2 A.m. to 4 A.m., an image-clustering request can be sent to the server, which is not limited.

In some embodiments, when the second preset condition is met, one or more images may be selected in the mobile terminal and uploaded to the server, and an image-clustering request may be sent to the server. The server receives the images uploaded by the mobile terminal, recognizes the uploaded images, and extracts features of the uploaded images. The server clusters the images uploaded by the mobile terminal in response to the image-clustering request, and analyzes the features of the uploaded images via a preset clustering model and partitions images containing similar features into a class, and determines a group for each uploaded image and adds a corresponding group tag so as to obtain a second clustering-result. The group tag is used to indicate a group to which an image belongs.

At block 540, the method receives the second clustering-result returned from the server, and updates at least one of the first clustering-result and the second clustering-result according to a preset rule.

The mobile terminal may receive the second clustering-result returned from the server. The second clustering-result includes a second image identifier and a corresponding second group tag for an image. The mobile terminal may compare the first clustering-result with the second clustering-result. When the first clustering-result is different from the second clustering-result, at least one of the first clustering-result and the second clustering-result is updated based on the preset rule. The first clustering-result being different from the second clustering-result means that, for a same image identifier for an image, the first group tag in the first clustering-result is different from the second group tag in the second clustering-result. That is, the image is partitioned into a group during the local clustering, which is different from a group into which the image is partitioned during the sever clustering. The first clustering-result being different from the second clustering-result also means that, for a same image identifier for an image, face-information obtained from local recognition being performed for the image by the mobile terminal is different from that obtained from the image being recognized by the server. However, it is not limited to these.

In some embodiments, the preset rule may be set according to actual requirements. For example, the preset rule may base on the second clustering-result of the server. When the first clustering-result is different from the second clustering-result, the mobile terminal determines that that the first image identifier of the image in the first clustering-result is different with the second image identifier for an image, and updates the first clustering-result having the first image identifier to the second clustering-result. The preset rule may also base on the newest clustering time point, and a clustering time point of the local clustering for an image and a clustering time point of the sever clustering for the image are determined. When the clustering time point of the local clustering is later than the clustering time point of the server clustering, the mobile terminal remains the first clustering-result having first image identifier and sends the first clustering-result having first image identifier to the server, and the server updates the second clustering-result having different image identifiers to the first clustering-result. When the clustering time point of the local clustering is earlier than the clustering time point of the sever clustering, the mobile terminal may update the first clustering-result having first image identifier to the second clustering-result. However, it is not limited to these.

In some embodiments, when the first clustering-result is inconsistent with the second clustering-result, the mobile terminal may determine that the first image identifier for an image is inconsistent with the second image identifier for the image, and determine whether the first image identifier inconsistent with the second image identifier is resulted from manually-grouping. When the first image identifier inconsistent with the second image identifier is resulted from manually-grouping, the mobile terminal may adopt local clustering, and update the second clustering-result according to the first clustering-result having the first image identifier inconsistent with the second image identifier. When the first image identifier inconsistent with the second image identifier is not resulted from manually-grouping, the mobile terminal may adopt server clustering, and update the first clustering-result according to the second clustering-result having the second image identifier inconsistent with the first image identifier.

After the mobile terminal updates at least one of the first clustering-result and the second clustering-result according to the preset rule, the mobile terminal may put an image to a respective group according to the updated group tag, and display the image in a corresponding album for easy search.

In this embodiment, when the first preset condition is met, the mobile terminal performs local clustering for an image, and when the second preset condition is met, the mobile terminal performs server clustering for the image. The first clustering-result of the local clustering is combined with the second clustering-result of the server clustering. Double-end clustering, which includes the local clustering and the server clustering, improves the accuracy of image clustering and the efficiency of image clustering.

Figure 6:
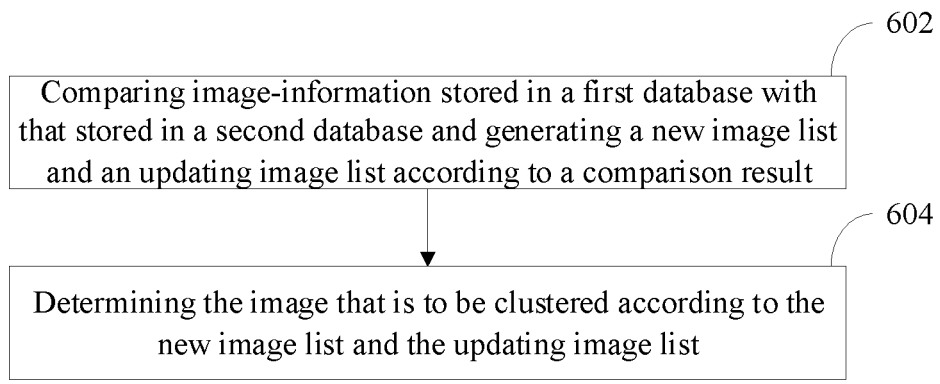
FIG. 6 is a flow chart for determining an image that is to be clustered according to some embodiments.

As shown in FIG. 6, in some embodiments, before the acquiring the first image-information of the image that is to be clustered, the method further includes actions/operations at blocks 602-604.

At block 602, the method compares image-information stored in a first database with that stored in a second database, and generates a new image list and an updating image list according to a comparison result.

When the first preset condition is met, the mobile terminal obtains an image that is to be clustered for clustering. The image that is to be clustered may be an image stored on the mobile terminal without being grouped, that is, it may be an image without being clustered. The image that is to be clustered may also be an image that is in a corresponding group but needs to be re-clustered. The mobile terminal can determine the image that is to be clustered by comparing the image-information stored in the first database and the second database, and cluster the image that is to be clustered according to a face.

In this embodiment, the first database refers to a media database, and the media database may be used to store information of multimedia files such as images, videos, and audio, and may be configured for a video player, an audio player, and an album gallery. The first database includes a field of a storage path, a field of a message digest, a field of a multimedia number, and a field of a modification time of an image, and is used for storing image-information. In some embodiments, the first database may include a media database for an SD (Secure Digital) card and a media database for a memory. The media database for the SD card may be used to store multimedia information of the SD card, and the media database for the memory may be used to store the multimedia information for the memory. The second database refers to a face database, and the face database may store a face-recognition result, a feature, and group information of each image. The face database can include multiple types of fields such as a picture attribute, a face attribute, and a group attribute. The picture attribute can include a field of a storage path, a field of a message digest, a field of a multimedia number, and a field of a modification time of an image. The face attribute can include a field of face status, a field of face size, and a field of face feature. The group attribute can include a field of group identifier, a field of a group name, and a field of creating time, which are not limited herein. When the mobile terminal acquires a new image, for example, being captured through a camera or received from other computer equipment, the new image needs to be stored in the first database. When face-recognition is performed for the new image, a feature of the new image is extracted, and information of the new image, the feature, and group information can be stored in the face database after the new image is clustered according to the feature.

In other embodiments, image-clustering is performed according to other features in addition to the face, for example, scenes, location, or time. The second database may be a database storing feature information for clustering and clustering-results, and is not limited to the aforementioned face database.

The mobile terminal can compare the image-information stored in the first database with the image-information stored in the second database, which means comparing the storage path, multimedia number, modification time, or message digest of an image, and generate at least one of a new image list and an updating image list. In some embodiments, the new image list records images for which face-recognition is not performed in the mobile terminal. The mobile terminal may add images that exist in the first database but not in the second database to the new image list. The updating image list records images for which face recognition is performed and having a content varied after the face recognition. The mobile terminal can add images that exist in both the first database and the second database at the same time but has a varied content, into the updating image list. That is, the new image list includes an image for which face-recognition is not performed, and the updating image list includes an image for which face-recognition is performed and having a content varied after the face recognition.

When there are only images without being performed face recognition, but no images for which face recognition is performed and having a content varied after the face recognition in the mobile terminal, only the new image list is generated according to the comparison result. When there are only images for which face recognition is performed and having a content varied after the face recognition, but no images without being performed face recognition in the mobile terminal, only the updating image list is generated according to the comparison result. When there are images without being performed face recognition and images for which face recognition is performed and having a content varied after the face recognition in the mobile terminal, both the new image list and the updating image list are generated according to the comparison result.

At block 604, the method determines the image that is to be clustered according to the new image list and the updating image list.

The mobile terminal may directly use images included in the generated new image list and the updating image list as images that are to be clustered, and extract features of the images that are to be clustered for clustering. When the mobile terminal only generates the new image list, an image included in the new image list may be directly used as the image that is to be clustered. When the mobile terminal only generates the updating image list, an image included in the updating image list may be directly used as the image that is to be clustered. When the mobile terminal generates a new image list and an updating image list, images included in the new image list and the updating image list can be directly used as images that are to be clustered. That is, an image that is to be clustered is from at least one of a new image list and an updating image list, and as described above, the new image list includes an image for which face-recognition is not performed, and the updating image list includes an image for which face-recognition is performed and having a content varied after the face recognition. In some embodiments, when the mobile terminal generates the updating image list, the mobile terminal may determine whether there is an image having a corresponding group and needing to be re-clustered in the updating image list. Each image in the updating image list may be re-recognized, a feature of each image in the updating image list is extracted, and then stored feature corresponding to each image in the updating image list are obtained from the second database. The mobile terminal may compare the extracted feature with the corresponding feature stored in the second database. If a similarity between the extracted feature and the corresponding feature stored in the second database is greater than or equal to a preset value, the image having the similarity greater than the preset value is determined not to be re-clustered. If the similarity between the extracted feature and the corresponding feature stored in the second database is less than the preset value, the image having the similarity less than the preset value is determined to be re-clustered. The mobile terminal may use images in the new image list and the updating image list that need to be re-clustered as images that are to be clustered. That is, a similarity between a first feature and a second feature of a first image being less than a preset value indicates that the first image has a content varied after the face recognition, wherein the second feature is obtained as the first image is recognized, and the first feature is obtained as the first is re-recognized.

In this embodiment, the mobile terminal compares the image-information stored in the first database with that in the second database, generates a new image list and an updating image list, and determines the image that is to be clustered. The local clustering is performed for the image that is to be clustered, which can improve the efficiency of image clustering.

Figure 7:
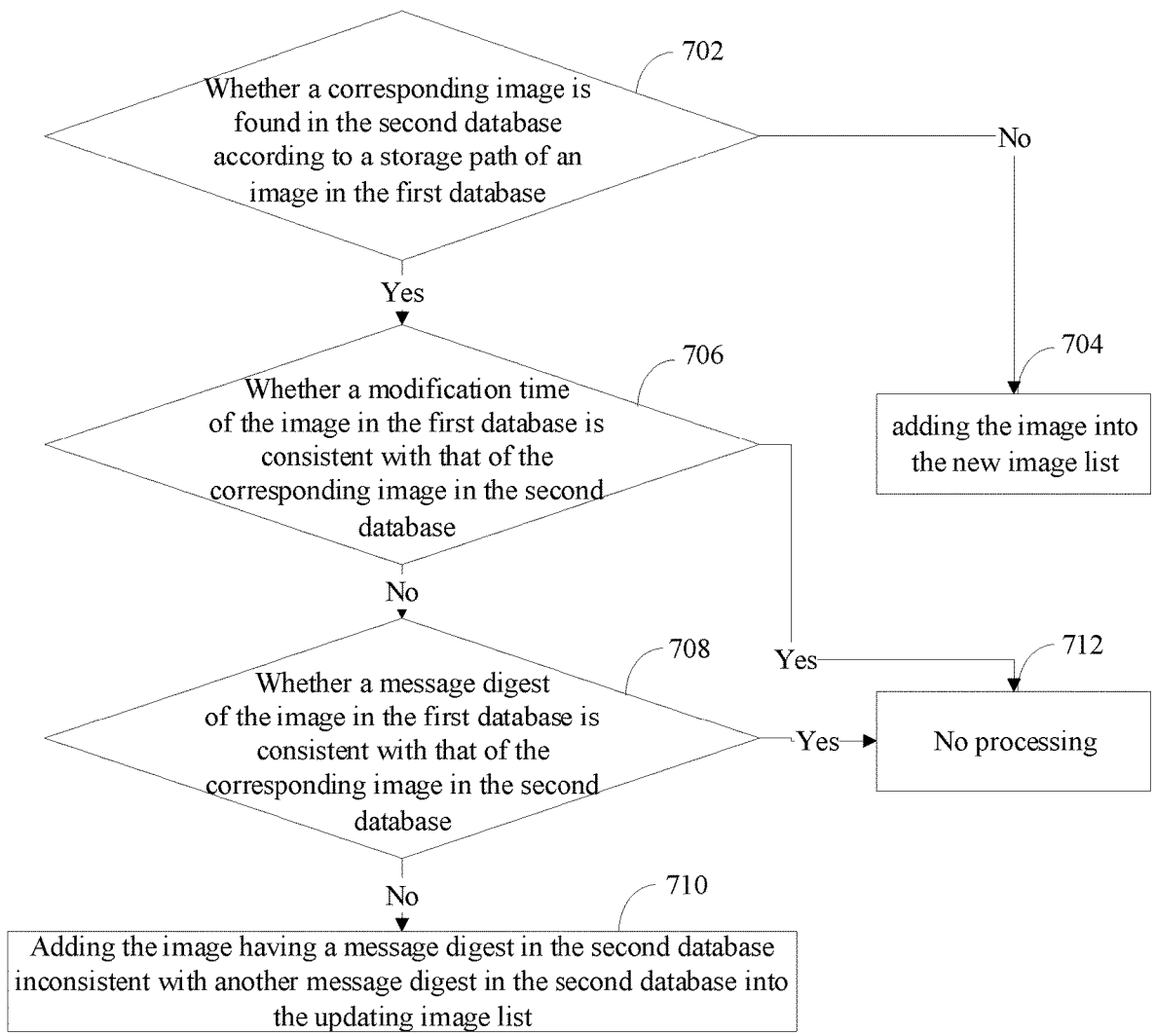
FIG. 7 is a flow chart for generating a new image list and an updating image list according to some embodiments.

As shown in FIG. 7, in some embodiments, comparing the image-information stored in the first database with that in the second database and generating a new image list and an updating image list according to the comparison result at block 602 includes actions/operations at blocks 702-712.

At block 702, the method determines whether a corresponding image is found in the second database according to a storage path of an image in the first database. If yes, an action/operation at block 706 is performed, and if not, an action/operation at block 704 is performed.

The mobile terminal can search in the second database according to the storage path of the image in the first database, and determine whether a face-recognition result corresponding to the image is stored in the second database. A field value of a storage path of each image stored in the first database is read, and find whether the second database includes a field value of a storage path consistent with a read field value. If yes, the image having the field value of storage path consistent with the read field value in the second data base is the corresponding image in the second database. In some embodiments, the mobile terminal may also search for the corresponding image in the second database according to the multimedia number of each image in the first database. If an image having a multimedia number same with that of an image in the first database is found in the second database, the image having the same multimedia number is the corresponding image in the second database.

At block 704, the method adds the image in the first database into the new image list as no corresponding image is in the second database.

If the mobile terminal does not find the corresponding image in the second database according to the storage path of the image in the first database, image-information of the image only exists in the first database and does not exist in the second database, indicating that the image is not performed face-recognition. An image in the first database without a corresponding image found in the second database can be added to the new image list. Further, the new image list records identification information of an image existing only in the first database but not in the second database. The identification information may be a multimedia number, a storage path, and the like.

At block 706, the method determines whether a modification time of the image in the first database is consistent with that of the corresponding image in the second database. If yes, action/operation at block 712 is performed, and if no, action/operation at block 708 is performed.

If the corresponding image can be found in the second database, the mobile terminal can extract a field value of the modification time of the image in the first database and the field value of the modification time of the corresponding image in the second database and determine whether field value of the modification time of the image in the first database is consistent with that the corresponding image. If the modification time of the image is consistent with that of the corresponding image, it means that the image is not modified after the image has been performed face-recognition and is stored in the second database. If the modification time of the image in the first database is not consistent with the modification time of the corresponding image in the second database, it means that the image is modified after the image has been performed face-recognition and is stored in the second database.

At block 708, the method determines whether a message digest of the image in the first database is consistent with that of the corresponding image in the second database. If yes, action/operation at block 712 is performed, and otherwise, action/operation at block 710 is performed.

If the modification time of the image in the first database is inconsistent with that of the corresponding image in the second database, the mobile terminal may extract a field value of the message digest of the image stored in the first database and a field value of the message digest of the corresponding image in the second database, and determined whether the field value of the message digest image is consistent with that of the corresponding image in the second database. The message digest can also be referred to as a digital summary. Each message digest is a fixed-length value that can uniquely correspond to a message or text. Whether the message digest of an image in the first database is consistent with that of the corresponding image in the second database can used to determine whether the image has a varied content. If the message digests are inconsistent, it means that the image is performed face-recognition and stored in the second database and has a varied content after the face-recognition, and thus, the image stored in the first database and the corresponding image in the second database are not a same image with a same content.

In some embodiments, the message digest of an image may be MD5 (the fifth Message Digest Algorithm), may also be another hash algorithm, which is not limited. Each time the mobile terminal stores a new image or modifies the image, the message digest of the image can be calculated according to an algorithm such as MD5, and the message digest is stored in the first database combined with the multimedia number and storage path of the image.

At block 710, the method adds the image having a message digest in the second database inconsistent with another message digest in the second database into the updating image list.

The mobile terminal may add an image in the first database whose message digest is different from that of the corresponding image in the second database into the updating image list, and the updating image list may record images for which are performed face-recognition and having a varied content after the face recognition, Further, the updating image list records identification information of an image for which are performed face-recognition and having a varied content after the face recognition.

At block 712, the method performs no processing.

When an image has a modification time in the first database different from that of the second database, but a same message digest, it means that the image has been modified after the face-recognition, but the content of the image has not been changed. Thus, the image may not be processed.

In this embodiment, the mobile terminal compares the image-information stored in the first database with that in the second database, generates a new image list and an updating image list, and then determines the image that is to be clustered. The local clustering is performed for the image that is to be clustered, which can improve the efficiency of image clustering and reduce the image processing pressure of the mobile terminal.

Figure 8:
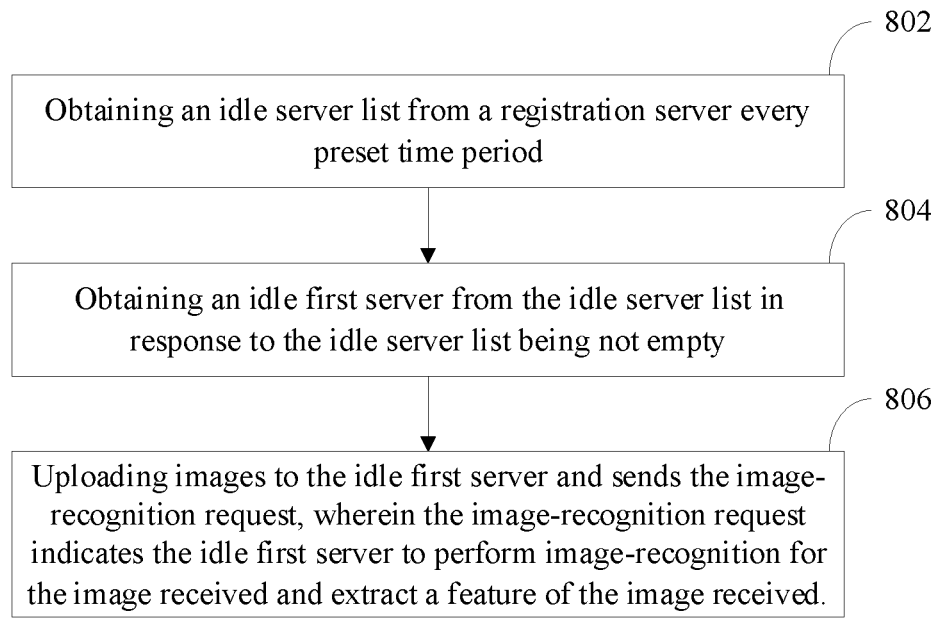
FIG. 8 is a flow chart for uploading images to a first server according to some embodiments.

As shown in FIG. 8, in some embodiments, before sending the image-clustering request to the server, the method further includes actions/operations at blocks 802-806.

At block 802, the method obtains an idle server list from a registration server every preset time period.

When the second preset condition is met, the mobile terminal uploads the image to a first server, and the first server performs a feature-recognition and a feature-extraction for the image. Further, image-information stored in the first database is compared with that in the second database in the mobile terminal, a new image list and an updating image list are generated according to a comparison result, and then the image that is to be clustered is determined according to the new image list and the updating image list and uploaded to the first server. In some embodiments, the first server may be a distributed first server cluster including multiple hosts. The first server cluster includes multiple first servers, and each first server may be configured to provide a service of feature-recognition and a service of feature-extraction for the mobile terminal. The registration server of the first server cluster is constructed through ZooKeeper. ZooKeeper is a distributed application coordination service with an open source. The registration server is used to perform a monitoring service for each first server included in the first server cluster, which means monitoring whether each of the first servers is in an available and idle state or an un-available and busy state. When a first server is in the un-available and busy state, the first server sends an unload instruction to the registration server, and the registration server deletes address information corresponding to the first server in response to the unload instruction. Thus, the first server no longer provides services for the mobile terminal. When the first server is in the available and idle state, the first server sends a registration instruction to the registration server, and the registration server stores address information corresponding to the first server in response to the registration instruction. Thus, the first server provides services for the mobile terminal again.

In some embodiments, each of the first servers in the first server cluster may be configured with an upper processing value, and the upper processing value is used to limit the number of images for which a corresponding first server performs feature-recognition and feature-extraction at most. When the number of unprocessed images stored in a first server reaches a corresponding upper processing limit value, the first server is in un-available and busy state, sends an unload instruction to the registration server, and no longer receives images sent from the mobile terminal. Each of the first servers may be configured with an idle value at the same time. When the number of unprocessed images stored in a first server is less than or equal to the idle value, the first server is in an available and idle state, sends a registration instruction to the registration server to be re-registered in registration server, and receives images sent from the mobile terminal.

The registration server provides a unified detection interface for the mobile terminal, and the mobile terminal calls the detection interface every preset time period to obtain an idle server list from the registration server. The idle server list records address information of first servers which are in the available and idle state. It can be understood that, the preset time period can be set according to actual requirements, such as 5 minutes and 10 minutes.

In other embodiments, a passive notification manner may also be adopted. The mobile terminal firstly sends a service request to the registration server. When the registration server monitors that there is an idle first server, the registration server notifies address information of the idle first server to the mobile terminal.

At block 804, the method obtains an idle first server from the idle server list in response to the idle server list being not empty.

The mobile terminal obtains the idle server list from the registration server, and may firstly determine whether the idle server list is empty. If yes, it means that there is no first server available currently, and at this time, no images are uploaded by the mobile terminal. If the idle server list is not empty, the mobile terminal may read address information of a first server from the idle server list, which is in the available and idle state. The address information may include the IP (Internet Protocol) address and the MAC (Media Access Control layer) address of the first server.

In some embodiments, if the idle server list includes multiple idle first servers, the mobile terminal may randomly select one of the first servers to which image are uploaded, or directly read address information of a first server arranged in the frontmost of the idle server list. Also, a server whitelist may be stored in the mobile terminal. The server whitelist records address information of legal servers. Address information of first servers in the idle server list is filtered according to the server whitelist, and then a first server that is not in the server whitelist is removed. The server whitelist stored in the mobile terminal prevents illegal users from tampering with the idle server list of the registration server and causing a problem of user information leakage.

At block 806, the method uploads images to the idle first server and sends the image-recognition request. The image-recognition request indicates the idle first server to perform image-recognition for the image received by the idle first server and extract a feature of the image received by the idle first server.

The mobile terminal may upload an image to a corresponding first server according to the address information of the first server read from the idle server list, and simultaneously send the image-recognition request. The image-recognition request may carry an identifier and an account of the mobile terminal that sent the request. After receiving the image-recognition request sent from the mobile terminal and the uploaded image, the first server performs image-recognition for the image in response to the image-recognition request and extract a feature of the image.

In some embodiments, the first server encrypts the received images with a encryption algorithm such as 3DES (Triple Data Encryption Algorithm) and RCS. The first server may cache the encrypted images in a file queue. The file queue is used to control a speed at which the first server recognizes images and prevent the first server from being overloaded. For example, the first server may be controlled to recognize 100 images per second. That is, the first server can only read the cached 100 images from the file queue per second for recognition processing. After reading the cached images from the file queue, the first server decrypts each read image, recognizes the images according to a preset feature-recognition model, and extracts a feature of each image. In some embodiments, the first server may perform face-recognition for the image according to the preset feature-recognition model, and extract feature points included in the image that are used to describe a shape of the face and shapes and locations of the facial features. The first server stores the extracted feature in a database in association with image-information of the corresponding image and an identifier and an account of the mobile terminal, and simultaneously reports the extracted feature, image-information of the corresponding image, and the identifier and the account of the mobile terminal to a second server for image-clustering.

Figure 9:
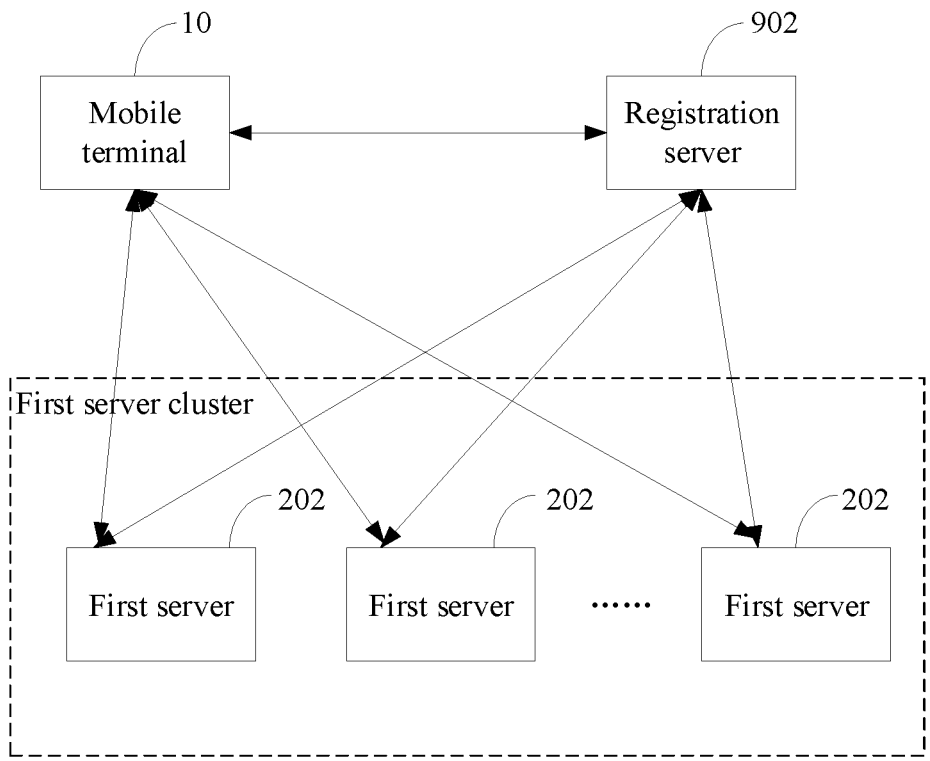
FIG. 9 is an architecture diagram of a first server according to some embodiments.
Figure 10:
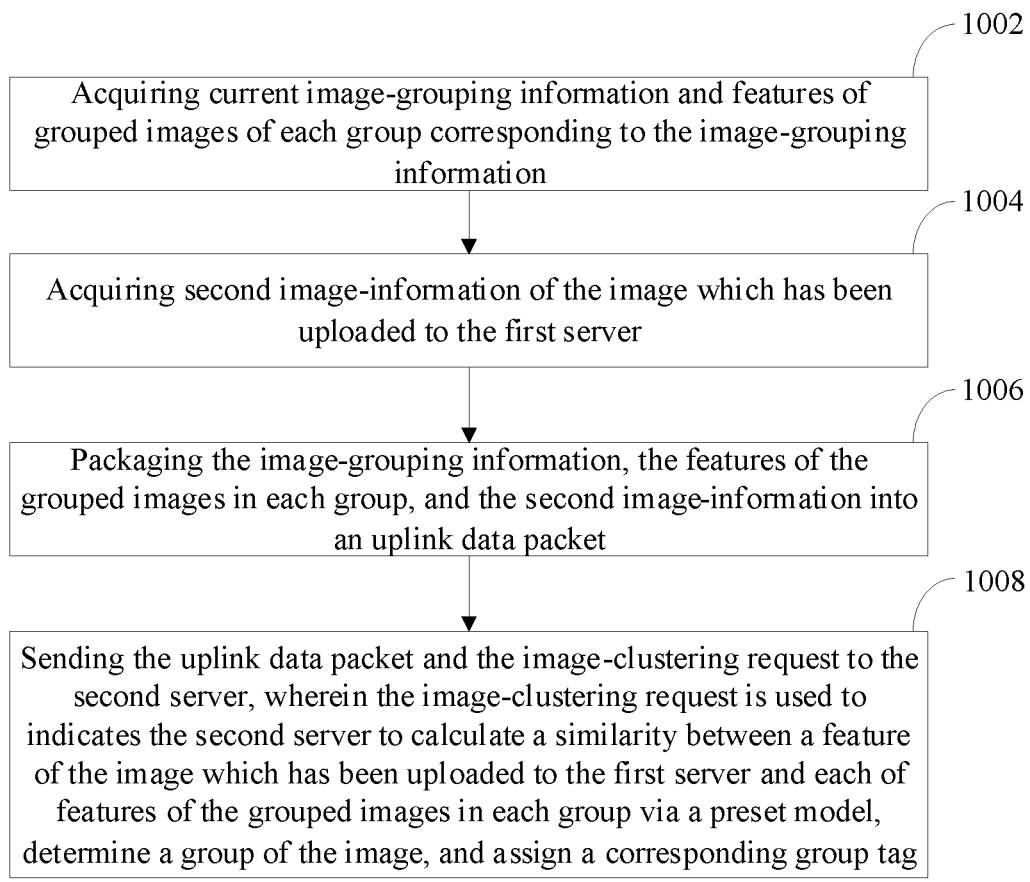
FIG. 10 is a flowchart of sending an image-clustering request to a second server according to some embodiments.

FIG. 9 is an architecture diagram of a first server according to some embodiments. As shown in FIG. 9, a first server cluster includes a plurality of first servers 202, and each of the first servers 202 may provide a service of feature-recognition and a service of feature extraction for a mobile terminal 10. A registration server 902 monitors multiple first servers 202 in the first server cluster. When a first server 202 is in the un-available and busy state, the first server sends an unload instruction to the registration server 902, and the registration server 902 deletes address information corresponding to the first server 202 in response to the unload instruction. Thus, the first server 202 no longer provides services for the mobile terminal 10. When the first server 202 is in the available and idle state, the first server sends a registration instruction to the registration server 902, and the registration server 902 stores address information corresponding to the first server 202 in response to the registration instruction. Thus, the first server 202 provides services for the mobile terminal 10 again. The mobile terminal 10 may obtain the idle server list from the registration server 902 every preset time period, and read address information of the first server 202 in the available and idle state from the idle server list. The mobile terminal 10 may upload an image and simultaneously send an image-recognition request to the first server 202, according to the read address information of the first server 202. The first server 202 performs image-recognition for the image in response to the image-recognition request, and extracts a feature of the image.

In this embodiment, the mobile terminal may obtain an idle server list from the registration server every preset time period, obtain an idle first server from the idle server list to which an image is uploaded, and send an image-recognition request. Thus, balanced load can be achieved for the servers, and processing pressure of the servers can be reduced.

In some embodiments, the step of sending an image-clustering request to the second server includes: when receiving a completing-receiving instruction returned from the first server, sending the image-clustering request to a second server according to the received completing-receiving instruction. The image-clustering request is used to indicate the second server to cluster a feature of the image uploaded to the first server via a preset model, determine a group for the image, and assign a corresponding group tag.

The mobile terminal uploads one or more images to the first server. When having received the image, the first server may send a completing-receiving instruction to the mobile terminal. When receiving the completing-receiving instruction returned by the first server, the mobile terminal may send the image-clustering request to the second server in response to the completing-receiving instruction, so as to request clustering the image uploaded to the first server. In some embodiments, the second server may be a distributed second server cluster including multiple hosts. The second server cluster may include multiple second servers, and each second server may provide a service of image-clustering for the mobile terminal. After the mobile terminal sends an image-clustering request to the second server cluster, the second server cluster adds the image-clustering request into a request queue, and allocate an image-clustering request to each second server in the second server cluster according to the request queue. A second server that is allocated with an image-clustering request performs image-clustering. Each image-clustering request contained in the request queue can carry an identifier and an account of the mobile terminal that sends the request, and sending time at which the mobile terminal sends the request.

In some embodiments, an image-clustering request may be allocated to a second server in the second server cluster according to an order of sending time of each image-clustering request in the request queue. When allocating an image-clustering request, the second server cluster detects whether the request queue contains another image-clustering request having a different sending time and being sent from the same mobile terminal with that of an allocated image-clustering request. When the request queue contains another image-clustering request, the another image-clustering request, which has a different sending time and is sent from the same mobile terminal with that of an allocated image-clustering request, is merged with the allocated image-clustering request, and the merged image-clustering request is sent to the second server. The second server may also detect whether the request queue contains another image-clustering request sent from a same account on different mobile terminals with that of the allocated image-clustering request. When the request queue contains the another image-clustering request, the another image-clustering request, sent from a same account on different mobile terminals, is merged with the allocated image-clustering request, and the merged image-clustering request is sent to the second server.

The first server recognizes an image uploaded by the mobile terminal and extracts a feature of the image, and reports the feature of the image, image-information of the image, and an identifier and an account of the mobile terminal to the second server. After the second server receives the image-clustering request, the second server obtains the feature of the image corresponding to the image-clustering request according to the identifier and the account of the mobile terminal for the image-clustering request, and clusters the feature of the image corresponding to the image-clustering request via a preset clustering model. The features is analyzed via the clustering model, the image and another image having similar features are partitioned into a same group, and a corresponding group tag is assigned to the group. The second server may return the second clustering-result including a second image identifier and a corresponding second group tag to the mobile terminal according to the identifier of the mobile terminal carried in the image-clustering request.

In some embodiments, when the second server receives a merged image-clustering request, the second server directly obtains and clusters a feature of a corresponding image corresponding to each image-clustering request contained in the merged image-clustering request, which can improve the efficiency of clustering-image.

In this embodiment, the mobile terminal sends an image-clustering request to the second server, and the image-clustering request indicates the second server to cluster the feature of the image uploaded by the mobile terminal. Thus, the stored images are intelligently clustered, and clustering efficiency of images can be improved.

In some embodiments, the sending an image-clustering request to the second server includes actions/operations at blocks 1002-1008.

At block 1002, the method acquires current image-grouping information and features of grouped images of each group corresponding to the image-grouping information.

The mobile terminal obtains the current image-grouping information. The image-grouping information may include group information of each group such as a group identifier, a group name, and a creation time, and may also include image-information contained in each group, for example, identification information and storage path of a contained image. In some embodiments, the current image-grouping information may include grouping information of manually-grouping and grouping information of automatic-clustering. The grouping information of manually-grouping refers to grouping information resulted from a manual operation of a user, including creating a group by a user, merging groups, and manually-adjusting a group to which an image belongs. The grouping information of automatic-clustering refers to grouping resulted from the server or mobile terminal's clustering based on a feature of each image.

In some embodiments, the mobile terminal may obtain the current image-grouping information from the second database, and extract features of grouped images in each group from the second database according to the image-grouping information, and then determine features for each group.

At block 1004, the method acquires second image-information of the image which has been uploaded to the first server.

The mobile terminal acquires the second image-information of the image which has been uploaded to the first server. The second image-information may include an image identifier and a storage path of the image. The image identifier may be a name or a number of the image.

At block 1006, the method packages the image-grouping information, the features of the grouped images in each group, and the second image-information into an uplink data packet.

The mobile terminal may package the image-grouping information, the features of the grouped images in each group, and the second image-information into an uplink data packet in a preset format, and upload the uplink data packet to a second server for image-clustering. In some embodiments, the mobile terminal may perform packaging-processing according to the groups. Features of images belonging to a same group are packaged into an uplink data packet, and the uplink data packet carries information of the group such as a group identifier and a group name of the group.

At block 1008, the method sends the uplink data packet and the image-clustering request to the second server. The image-clustering request is used to indicates the second server to calculate a similarity between a feature of the image which has been uploaded to the first server and each of features of the grouped images in each group via a preset model, determine a group of the image, and assign a corresponding group tag.

The mobile terminal may upload the uplink data packet to the second server, and send an image-clustering request to the second server. After the second server receives the uplink data packet and the image-clustering request, the second server parses the uplink data packet to obtain the image-grouping information, the features of the grouped images in each group, and the second image-information of the image which has been uploaded. The second server obtains the feature corresponding to the second image-information and uploaded from the first server, and calculates a similarity between the feature of the image and each of the features of the grouped images in each group via a preset clustering model. When the similarity between the feature of the image and a feature of a grouped image in a group is greater than a second threshold, the image and the grouped image are considered to belong to a same class. The second server can assign the image into a group having a similarity greater than the second threshold, and allocate a group tag that matches the group. If no group has a similarity greater than the second threshold, it means that the image that is to be clustered does not belong to any one of the existing groups. Images not belonging to any one of the existing groups are re-clustered via a preset clustering model, images having similar features are partitioned into a new group, and a corresponding group tag are assigned to the images belonging to the same new group.

In some embodiments, the second server may formulate a clustering strategy according to actual requirements, and determine whether to only cluster images currently-uploaded from the mobile terminal to the first server, or to cluster all the images uploaded by the mobile terminal. For example, after the clustering model is updated by the second server, a clustering strategy for clustering all the images uploaded from the mobile terminal is formulated, in which a group having an attribute of manually-grouping is remained, and groups and images that are not resulted from manual operation of a user are re-clustered, during all uploaded images being clustered.

In this embodiment, the second server may group the uploaded images according to the existing grouping information and the features of the grouped images in each group. Thus, the clustering-result can be more accurate.

Figure 11:
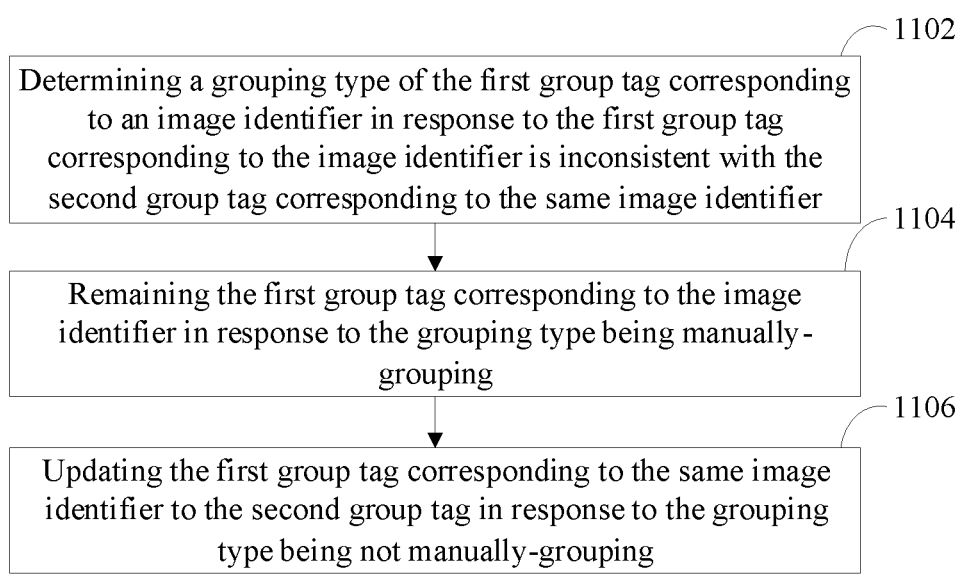
FIG. 11 is a flowchart of updating at least one of a first clustering-result and the second clustering-result according to a preset rule according to some embodiments.

As shown in FIG. 11, in some embodiments, the updating at least one of the first clustering-result and the second clustering-result according to a preset rule include actions/operations at blocks 1102-1106.

At block 1102, the method determines a grouping type of the first group tag corresponding to an image identifier in response to the first group tag corresponding to the image identifier is inconsistent with the second group tag corresponding to the same image identifier.

The first clustering-result may include the image identifier of the image and the first group tag assigned after local clustering is performed for the image. The second clustering-result may include the image identifier of the image and the second group tag assigned after the server clustering is performed for the image. The mobile terminal may compare the first clustering-result with the second clustering-result, and determine whether the first group tag corresponding to the image identifier is consistent with the second group tag corresponding to the same image identifier. When the first group tag is inconsistent with the second group tag, the grouping type of the first group tag corresponding to the same image identifier is determined. The grouping type may include manually-grouping and automatic-clustering. When images in the mobile terminal are grouped by a manual operation of a user, an image performed manual operation has a corresponding manual label. When the first group tag corresponding to the image identifier is inconsistent with the second group tag corresponding to the same image identifier, the mobile terminal detects whether the image identifier has a manual label. When the image identifier has the manual label, the grouping type of the first group tag corresponding to the image identifier is determined as manually-grouping. When the image identifier does not have the manual label, the grouping type of the first group tag corresponding to the image identifier is determined as automatic-clustering.

At block 1104, the method remains the first group tag corresponding to the image identifier in response to the grouping type being manually-grouping.

When the first group tag and the second group tag corresponding to the same image identifier are inconsistent, and the grouping type of the first group tag corresponding to the image identifier is manually-grouping, the mobile terminal may adopt the first clustering-result, and remains the first group tag corresponding to the image identifier. Groups resulted from the manual operation of a user is remained in the mobile terminal, which can make the grouping of images more suitable for requirements of the user.

At block 1106, the method updates the first group tag corresponding to the same image identifier to the second group tag in response to the grouping type being not manually-grouping.

When the first group tag corresponding to the same image identifier is inconsistent with the second group tag corresponding to the same image identifier, and the grouping type of the first group tag corresponding to the image identifier is not manually-grouping, the mobile terminal may adopt the second clustering-result, and update the first group tag corresponding to the image identifier to the second group tag. The mobile terminal may change the first group tag corresponding to the image identifier to the second group tag, add the image corresponding to the image identifier into a group having the second group tag, and displays the image in an album corresponding to the second group tag.

In this embodiment, double-end clustering, which contains the local clustering and the server clustering, can improve the accuracy of image-clustering and the efficiency of image-clustering.

Figure 12:
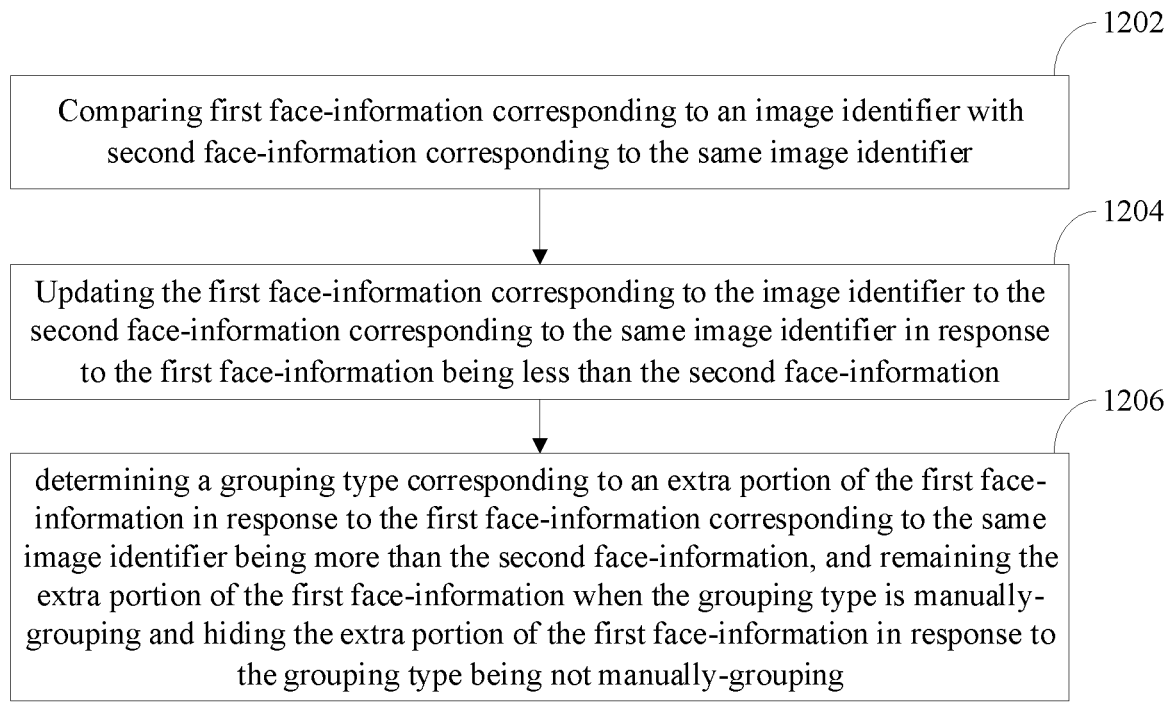
FIG. 12 is a flowchart of updating at least one of a first clustering-result and the second clustering-result to update according to a preset rule according to another some embodiments.

As shown in FIG. 12, in some embodiments, the updating at least one of the first clustering-result and the second clustering-result according to a preset rule include actions/operations at blocks 1202-1206.

At block 1202, the method compares first face-information corresponding to an image identifier with second face-information corresponding to the same image identifier.

The first clustering-result may include the image identifier and the first face-information resulted from local recognition, and the second clustering-result may include the image identifier and the second face-information resulted from server recognition. The first face-information and the second face-information can include features used to describe the shape of the face and facial features and obtained from image-recognition. Different faces can correspond to different face-information, and one face can correspond to one face-information.

At block 1204, the method updates the first face-information corresponding to the image identifier to the second face-information corresponding to the same image identifier in response to the first face-information being less than the second face-information.

The mobile terminal may compare the first clustering-result with the second clustering-result, and determine whether the number of faces in the first face-information corresponding to the image identifier is consistent with that in the second face-information corresponding to the same image identifier. When the first face-information corresponding to the same image identifier is less than the second face-information, it means that the number of faces recognized by the mobile terminal is less than the number of faces recognized by the server. The mobile terminal adopts the second clustering-result, and updates the first face-information corresponding to the image identifier to the second face-information.

At block 1206, the method determines a grouping type corresponding to an extra portion of the first face-information in response to the first face-information corresponding to the same image identifier being more than the second face-information, and remains the extra portion of the first face-information when the grouping type is manually-grouping and hides the extra portion of the first face-information in response to the grouping type being not manually-grouping.

When the first face-information corresponding to the image identifier is more than the second face-information corresponding to the same image identifier, it indicates that the number of faces recognized by the mobile terminal is more than the number of faces recognized by the server, and the mobile terminal may determine that a grouping type corresponding to the extra portion of the first face-information. In some embodiments, when the first face-information corresponding to the image identifier is more than the second face-information the same image identifier, the mobile terminal may detect whether the extra portion of the first face-information carries a manual label. When the extra portion of the first face-information carries the manual label, the grouping type of the extra portion of the first face-information is determined as manually-grouping, and the mobile terminal can remain the extra portion of the first face-information. When the extra portion of the first face-information does not have a manual label, the mobile terminal may determine that the grouping type of the extra portion of the first face-information is not a manually-grouping, and may hide the extra portion of the first face-information without being displayed in an album of the mobile terminal.

For example, the mobile terminal recognizes the image 'A' and obtains the face-information 'a' and the face-information 'b', that is, the first clustering-result of the image 'A' includes the face-information 'a' and the face-information 'b'. The server recognizes the image 'A' and obtains the face-information 'a', that is, the second clustering-result of the image 'A' includes the face-information 'a'. The first clustering-result of the image 'A' is compared the with the second clustering-result of the image 'A', and then the first face-information in the first clustering-result is more than the second face-information in the second clustering-result. The mobile terminal may determine a grouping type corresponding to the extra face-information 'b'. When the grouping type corresponding to the extra face-information 'b' is not manually-grouping, the mobile terminal hides the face-information 'b' of the image 'A', and then the image 'A' does not appear in a group corresponding to the face-information 'b'. When the grouping type corresponding to the extra face-information 'b' is manually-grouping, the mobile terminal remains the face-information 'b' of the image 'A', and then the image 'A' continues to appear in the group corresponding to the face-information 'b'.

In some embodiments, when the grouping type of the extra portion of the first face-information is manually-grouping, the mobile terminal may send the extra portion of the first face-information and the corresponding image identifier to the server for storage. The server may update the second face-information corresponding to the image identifier to the first face-information.

In this embodiment, double-end clustering, which contains the local clustering and the server clustering, can improve the accuracy of image clustering and the efficiency of image clustering.

In some embodiments, a method for image-processing is provided, including actions/operations in the following.

Step (1), the method searches in a second database according to a storage path of an image in a first database when a first preset condition is met, and adds the image into a new image list when no corresponding image is found in the second database, determines a message digest of the image in the first database is consistent with that of a corresponding image in the second database when a modification time of the image is inconsistent with another modification time of the corresponding image, and add the image having the modification time inconsistent with another modification time into an updating image list when the message digest of the image is inconsistent with that of a corresponding image.

Step (2), the method determines an image that is to be clustered according to the new image list and the updating image list, and obtains first image-information of the image that is to be clustered.

Step (3), the method clusters the image that is to be clustered according to the first image-information and obtains a first clustering-result.

Step (4), the method obtains an idle server list from a registration server every preset time period when a second preset condition is met, obtains an idle first server from the idle server list in response to the idle server list being not empty, and uploads the image and sends an image-recognition request to the idle first server. The image-recognition request indicates the idle first server to recognize the image received by the idle first server and extract a feature of the image received by the idle first server.

Step (5), the method obtains current image-grouping information and features of grouped images in each group corresponding to the image-grouping information, in response to receiving a completing-receiving instruction returned by the first server, and packages the image-grouping information, the features of the grouped images in each group, and second image-information into an uplink data packet, sends the uplink data packet and an image-clustering request to the second server, the image-clustering request being configured to indicate the second server to calculate a similarity between a feature of the image uploaded to the first server and the features of the grouped images in each group via a preset model, determine a group of the image and assign a corresponding group tag, and obtain a second clustering-result.

Step (6): the method receives the second clustering-result returned from the second server, and compares the first clustering-result with the second clustering-result. The first clustering-result includes an image identifier, first face-information, and an assigned first group tag, and the second clustering-result include the image identifier, second face-information, and an assigned second group tag.

Step (7), the method determines a grouping type of the first group tag corresponding to the image identifier in response to the first group tag corresponding to the image identifier being inconsistent with the second group tag corresponding to the same image identifier. when the grouping type is manually-grouping, the first group tag corresponding to the image identifier is remained, and when the grouping type is not manually-grouping, the first group tag corresponding to the image identifier is updated to the second group tag.

Step (8), the method compares first face-information corresponding to the image identifier with the second face-information corresponding to the same image identifier. When the first face-information corresponding to the same image identifier is less than the second face-information, the first face-information corresponding to the image identifier is updated to the second face-information, and when the first face-information corresponding to the same image identifier is more than the second face-information, a grouping type corresponding to an extra portion of the first face-information is determined. When the grouping type is manually-grouping, the extra portion of the first face-information is remained, and when the grouping type is not manually-grouping, the extra portion of the first face-information is hidden.

Step (9), the method sends the extra portion of the first face-information and the image identifier to the second server for storage in response to the grouping type of the extra portion of the first face-information being manually-grouping.

In this embodiment, when the first preset condition is met, the mobile terminal performs local clustering for an image, and when the second preset condition is met, the image is clustered by a server. The first clustering-result of the local clustering is combined with the second clustering-result of server clustering. Double-end clustering, which contains the local clustering and the server clustering, improves the accuracy of image clustering and the efficiency of image clustering.

Figure 13:
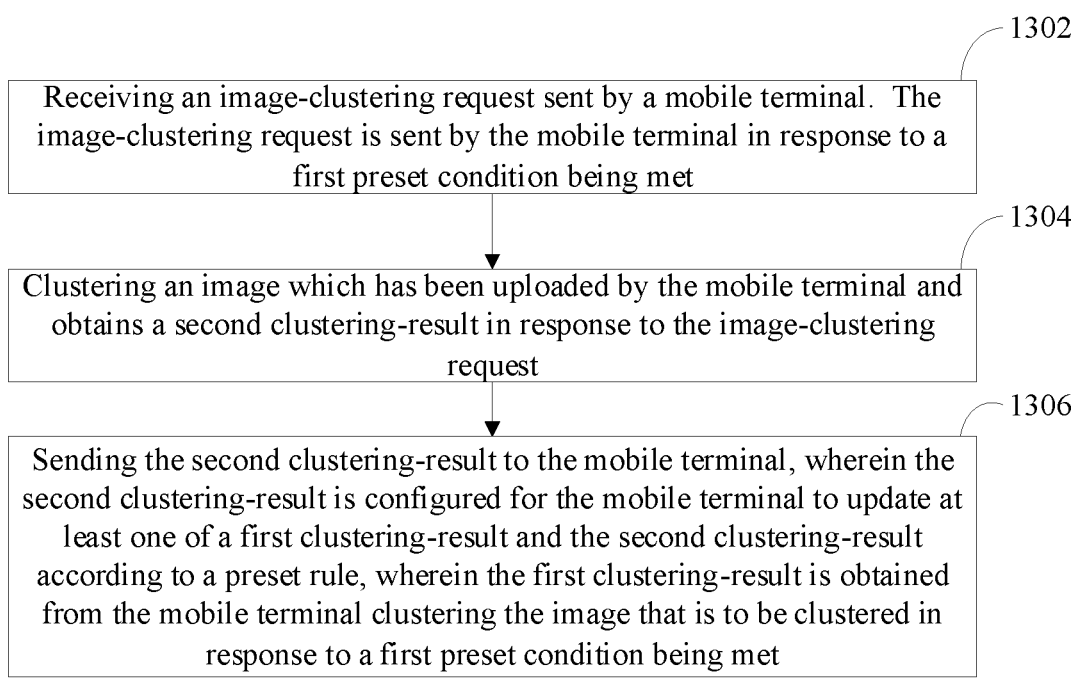
FIG. 13 is a flowchart illustrating a method for image-processing according to another some embodiments.

As shown in FIG. 13, in some embodiments, a method for image-processing is provided, which is executed by a server, including actions/operations at blocks 1302-1306.

At block 1302, the method receives an image-clustering request sent by a mobile terminal. The image-clustering request is sent by the mobile terminal in response to a first preset condition being met.

When the second preset condition is met, the mobile terminal can send the image-clustering request to the server. The second preset condition may be set according to actual requirements. For example, when a duration between the current time point in the mobile terminal and a previous time point at which the server was requested to perform image-clustering exceeds a preset duration, such as 48 hours, 72 hours, etc., the image-clustering request is sent to the server. When a power status of the mobile terminal meets a preset status, an image-clustering request is sent to the server, where the power status can include available remaining power, whether a power is in a charging state or not, power consumption speed, etc. The preset status can be that the available remaining power is greater than a preset percentage, being in a charging state, or the available remaining power is greater than a preset percentage and the power consumption speed is less than a set value, etc., which is not limited. When the current time point is in a preset clustering time period such as a time period from 2 A.m. to 4 A.m., an image-clustering request can be sent to the server, which is not limited.

At block 1304, the method clusters an image which has been uploaded by the mobile terminal and obtains a second clustering-result in response to the image-clustering request.

In some embodiments, when the second preset condition is met, one or more images may be selected in the mobile terminal and uploaded to the server, and the image-clustering request may be sent to the server. The server receives the images uploaded by the mobile terminal, recognizes the uploaded images, and extracts features of the uploaded images. The server clusters the images uploaded by the mobile terminal in response to the image-clustering request, and analyzes the features of the uploaded images via a preset clustering model and partitions images containing similar features into a class, and determines a group for each uploaded image and adds a corresponding group tag so as to obtain a second clustering-result.

At block 1306, the method sends the second clustering-result to the mobile terminal. The second clustering-result is configured for the mobile terminal to update at least one of a first clustering-result and the second clustering-result according to a preset rule, wherein the first clustering-result is obtained from the mobile terminal clustering the image that is to be clustered in response to a first preset condition being met.

The server sends the second clustering-result to the mobile terminal. The mobile terminal may compare the first clustering-result with the second clustering-result in response to the first preset condition being met. When the first clustering-result is different from the second clustering-result, at least one of the first clustering-result and the second clustering-result is updated based on the preset rule. The preset rule may be set according to actual requirements. For example, the preset rule may base on the second clustering-result of the server. When the first clustering-result is different from the second clustering-result, the mobile terminal determines that that an image identifier of the image in the first clustering-result is different with another image identifier of the image in the first clustering-result, and updates the first clustering-result having the first image identifier to the second clustering-result. The preset rule may also base on the newest clustering time point, and a clustering time point of the local clustering for an image and a clustering time point of the sever clustering for the image are determined. When the clustering time point of the local clustering is later than the clustering time point of the server clustering, the mobile terminal remains the first clustering-result having the different image identifier and sends the first clustering-result having the different image identifier to the server, and the server updates the second clustering-result having different image identifiers to the first clustering-result. When the clustering time point of the local clustering is earlier than the clustering time point of the sever clustering, the mobile terminal may update the first clustering-result having the different image identifier to the second clustering-result. However, it is not limited to these.

In this embodiment, when the first preset condition is met, the mobile terminal performs local clustering for an image, and when the second preset condition is met, the mobile terminal performs server clustering for the image. The first clustering-result of the local clustering is combined with the second clustering-result of the server clustering. Double-end clustering, which includes the local clustering and the server clustering, improves the accuracy of image clustering and the efficiency of image clustering.

Figure 14:
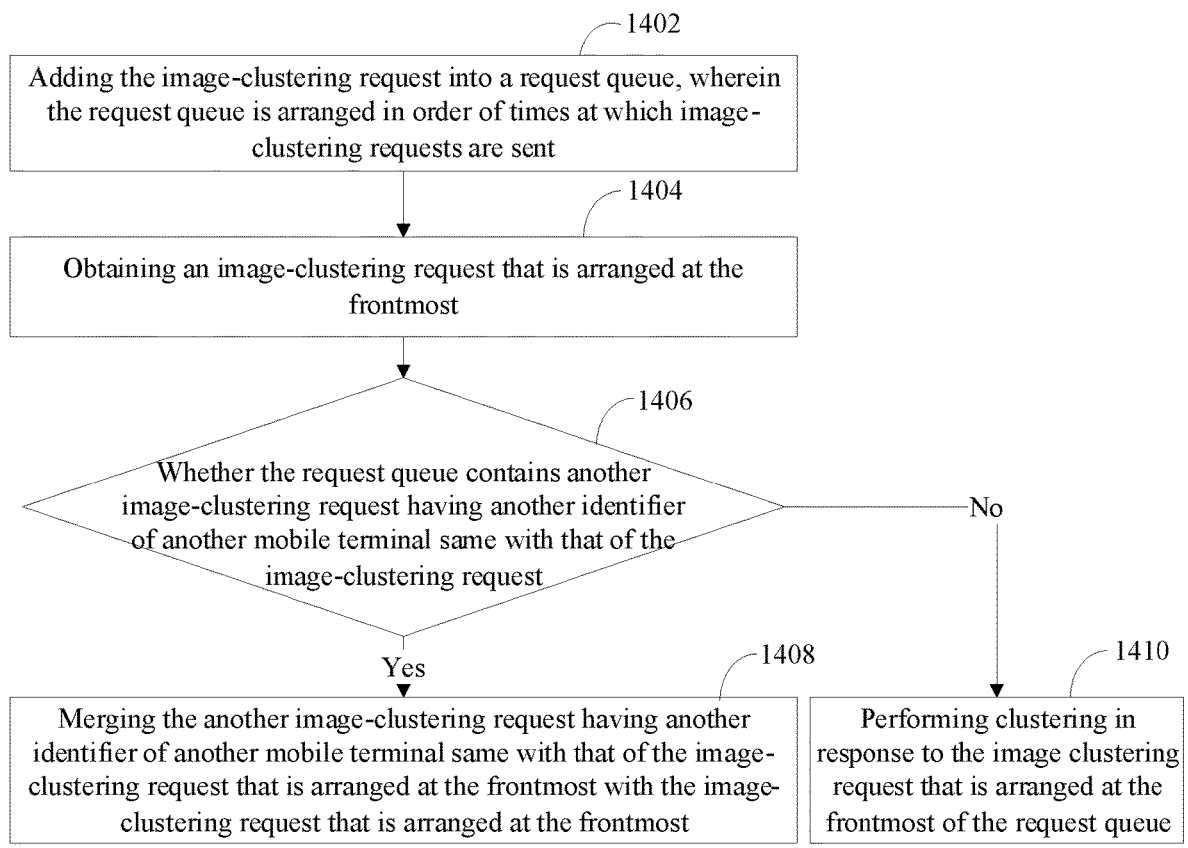
FIG. 14 is a flow chart of merging image-clustering requests according to some embodiments.

As shown in FIG. 14, in some embodiments, after the receiving the image-clustering request sent by the mobile terminal, the method further includes actions/operations at blocks 1402-1410.

At block 1402, the method adds the image-clustering request into a request queue, wherein the request queue is arranged in order of times at which image-clustering requests are sent.

The mobile terminal may send the image clustering request to the server, requesting the server to cluster the uploaded images. In some embodiments, the server may be a distributed server cluster including multiple hosts. The server cluster may include multiple servers, and each server may provide a service of image-clustering for the mobile terminal. After the mobile terminal sends an image-clustering request to the server cluster, the server cluster adds the image-clustering request into a request queue, and allocate an image-clustering request to each server in the server cluster according to the request queue. A server that is allocated with an image-clustering request performs image-clustering. Each image-clustering request contained in the request queue can carry an identifier and an account of the mobile terminal that sends the request, and sending time at which the mobile terminal sends the request.

At block 1404, the method obtains an image-clustering request that is arranged at the frontmost of the request queue.

An image-clustering request is allocated to a server of the server cluster according to an order of sending times of image clustering requests in the request queue. The server cluster can allocate the image-clustering request that is arranged at the frontmost of the request queue. to the server for cluster-processing. That is, an image-clustering request with the earliest sending time in the request queue is allocated to the server for clustering-processing.

At block 1406, the method detects whether the request queue contains another image-clustering request having another identifier of another mobile terminal same with that of the image-clustering request that is arranged at the frontmost of the request queue. If yes, action/operation at block 1408 is performed, and if no, action/operation at block 1410 is performed.

When allocating an image-clustering request, the server cluster detects whether the request queue contains another image-clustering request having a different sending time and being sent from the same mobile terminal with that of the image-clustering request that is arranged at the frontmost of the request queue. When the request queue contains another image-clustering request, the another image-clustering request, which has a different sending time and is sent from the same mobile terminal with that of an allocated image-clustering request, is merged with the image-clustering request that is arranged at the frontmost of the request queue, and the merged image-clustering request is sent to the server.

At block 1408, the method merges the another image-clustering request having another identifier of another mobile terminal same with that of the image-clustering request that is arranged at the frontmost of the request queue with the image-clustering request that is arranged at the frontmost of the request queue.

For example, the image-clustering request that is arranged at the frontmost of the request queue is sent by a mobile terminal 'A' at 6 a.m. on Aug. 2, 2017, and the server cluster detects that the request queue further contains another image-clustering request that is sent by the mobile terminal 'A' at 7 a.m. on Aug. 2, 2017, and another image-clustering request that is sent by the mobile terminal 'A' at 8 a.m. on Aug. 2, 2017. These three image-clustering requests sent by the same mobile terminal 'A' are merged, and the merged image-clustering request is allocated to the server for unified processing.

At block 1410, the method performs clustering in response to the image clustering request that is arranged at the frontmost of the request queue.

When the request queue does not contain another image-clustering request having another identifier of another mobile terminal same with that of the image-clustering request that is arranged at the frontmost of the request queue, the image-clustering request that is arranged at the frontmost of the request queue is directly allocated to the server.

In this embodiment, the server may merge image-clustering requests sent by the same mobile terminal at different times, which can improve the efficiency of clustering-image.

Figure 15:
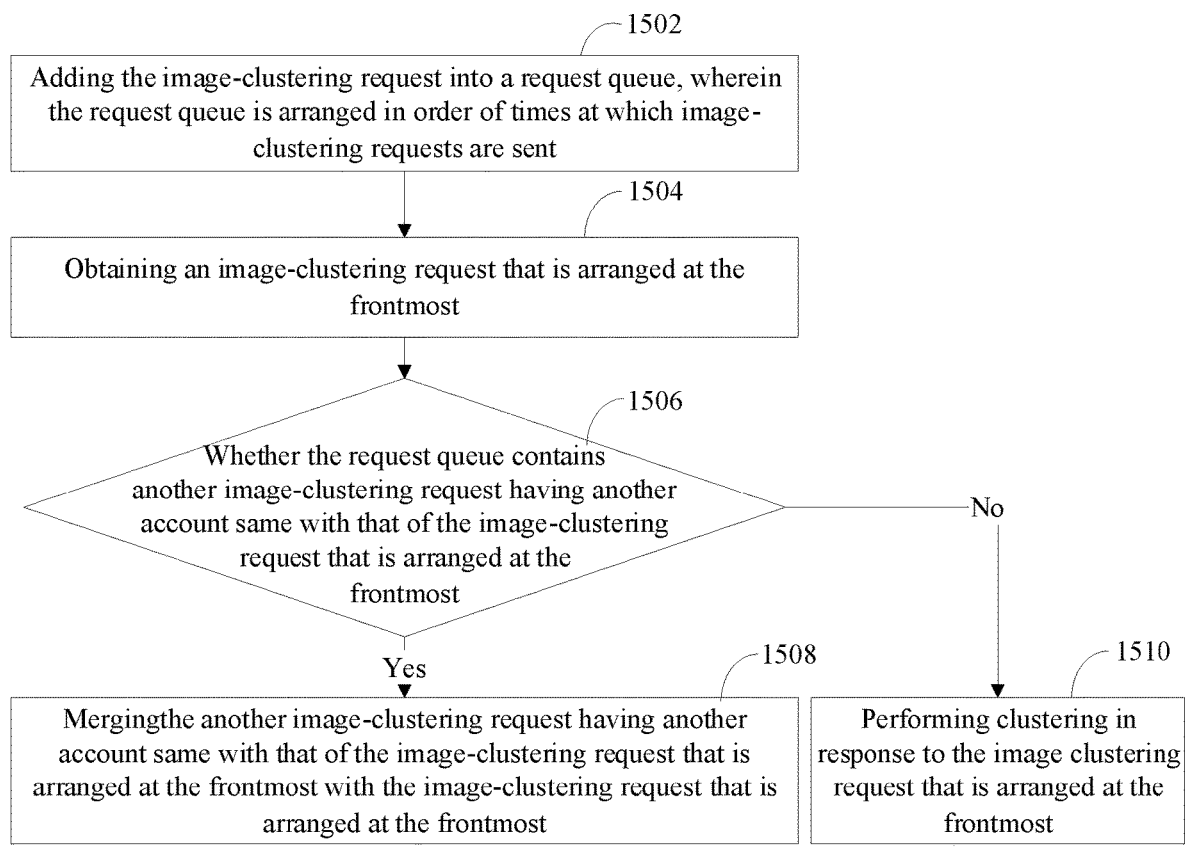
FIG. 15 is a flow chart of merging image-clustering requests according to another some embodiments.

As shown in FIG. 15, in some embodiments, after the receiving the image-clustering request sent by the mobile terminal, the method further includes actions/operations at blocks 1502-1510.

At block 1502, the method adds the image-clustering request into a request queue, wherein the request queue is arranged in order of times at which image-clustering requests are sent.

At block 1504, the method obtains an image-clustering request that is arranged at the frontmost of the request queue.

At block 1506, the method detects whether the request queue contains another image-clustering request having another account same with that of the image-clustering request that is arranged at the frontmost of the request queue. If yes, action/operation at block 1508 is performed, and if no, action/operation at block 1510 is performed.

When allocating an image-clustering request, the server may detect whether the request queue contains another image-clustering request sent from a same account with that of the image-clustering request that is arranged at the frontmost of the request queue. When the request queue contains the another image-clustering request, the another image-clustering request, sent from a same account, is merged with the image-clustering request that is arranged at the frontmost of the request queue, and the merged image-clustering request is sent to the server.

At block 1508, the method merges the another image-clustering request having another account same with that of the image-clustering request that is arranged at the frontmost of the request queue with the image-clustering request that is arranged at the frontmost of the request queue.

For example, the image-clustering request that is arranged at the frontmost of the request queue is sent by the account X on the mobile terminal 'A' at 6 a.m. on Aug. 2, 2017, and the server cluster detects that the request queue further contains another image-clustering request that is sent by the account X on the mobile terminal 'B' at 7 a.m. on Aug. 2, 2017. These two image-clustering requests sent by the same account X are merged, and the merged image-clustering request is allocated to the server for unified processing.

At block 1510, the method performs clustering in response to the image clustering request that is arranged at the frontmost of the request queue.

In this embodiment, the server may merge image-clustering requests sent by the same account, which can improve the efficiency of clustering-image.

Figure 16:
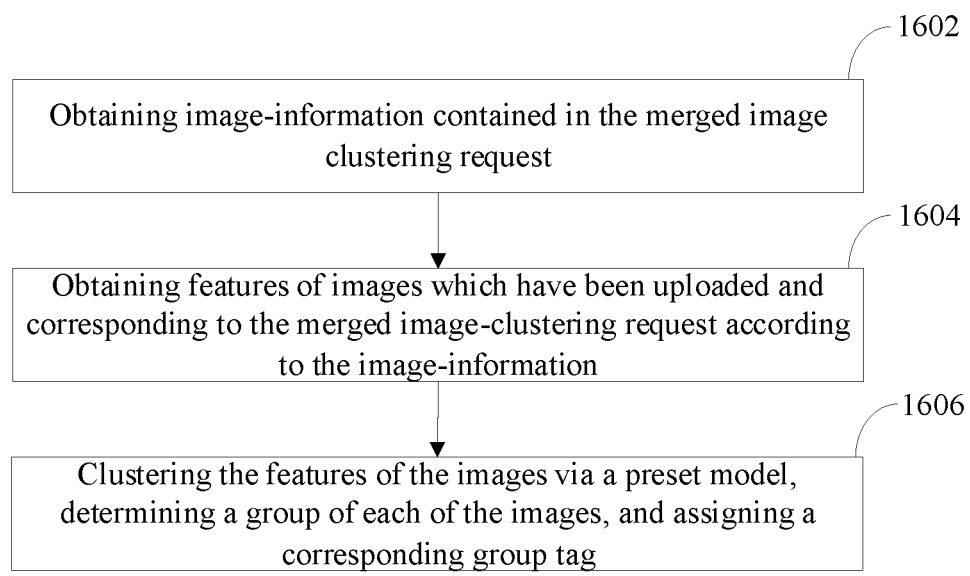
FIG. 16 is a flowchart of clustering according to a merged image-clustering request according to some embodiments.

As shown in FIG. 16, in some embodiments, the method further includes actions/operations at blocks 1602-1606.

At block 1602, the method obtains image-information contained in the merged image clustering request.

The server may obtain each image-clustering request included in the merged image clustering request, and obtain image-information included in each image clustering request. The image-information may include an image identifier and the like.

At block 1604, the method obtains features of images which have been uploaded and corresponding to the merged image-clustering request according to the image-information.

At block 1606, the method clusters the features of the images which have been uploaded via a preset model, determines a group of each of the images which have been uploaded and assigns a corresponding group tag.

The server can obtain the features of the images corresponding to the merged image-clustering request according to the image-information contained in the obtained merged image clustering request. The server analyzes the features of the images which have been uploaded via the preset clustering model and partitions images containing similar features into a class, and determines a group for each image which has been uploaded and adds a corresponding group tag.

In this embodiment, the server can uniformly process the merged image-clustering request, which can improve the efficiency of clustering-image.

Figure 17:
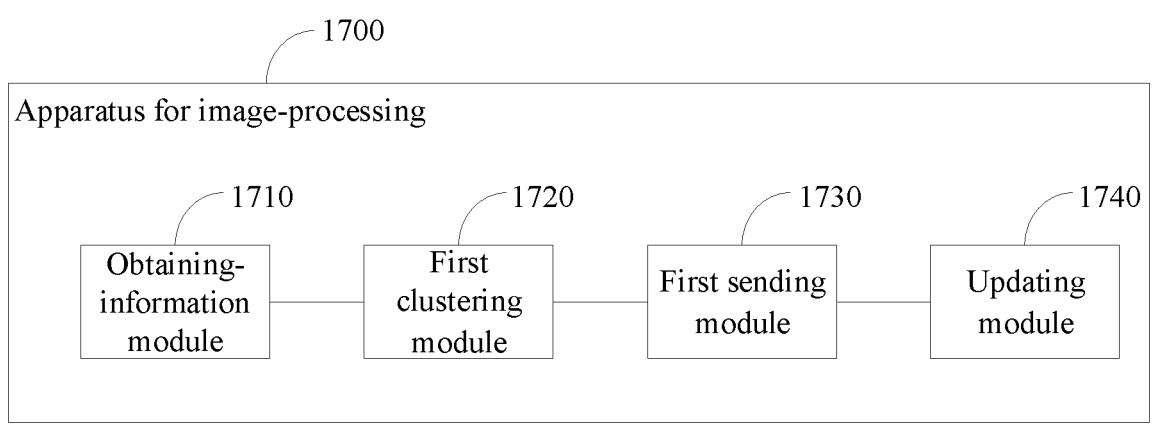
FIG. 17 is a block diagram of an apparatus for image-processing according to some embodiments.

As shown in FIG. 17, in some embodiments, an apparatus 1700 for image-processing is provided, including an obtaining-information module 1710, a first clustering module 1720, a first sending module 1730, and an updating module 1740.

The obtaining-information module 1710 is configured for obtaining first image-information of an image that is to be clustered in response to a first preset condition being met.

The first clustering module 1720 is configured for clustering the image according to the first image-information and obtaining a first clustering-result.

The first sending module 1730 is configured for sending an image-clustering request to a server in response to a second preset condition being met, wherein the image-clustering request is configured to indicate the server to cluster the image which has been uploaded to the server and obtain a second clustering-result.

The updating module 1740 is configured for receiving the second clustering-result returned from the first server and updating at least one of the first clustering-result and the second clustering-result according to a preset rule.

In some embodiments, the updating module 1740 is further configured to determine that an image identifier of an image is inconsistent with another image identifier of the image when the first clustering-result is inconsistent with the second clustering-result, update the second clustering-result according to the first clustering-result having the image identifier inconsistent with another image identifier when the image identifier inconsistent with another image identifier is resulted from manually-grouping, and update the first clustering-result according to the second clustering-result having another image identifier inconsistent with the image identifier When the image identifier inconsistent with another image identifier is not resulted from manually-grouping.

In this embodiment, when the first preset condition is met, the mobile terminal performs local clustering for an image, and when the second preset condition is met, the mobile terminal performs server clustering for the image. The first clustering-result of the local clustering is combined with the second clustering-result of the server clustering. Double-end clustering, which includes the local clustering and the server clustering, improves the accuracy of image clustering and the efficiency of image clustering.

In some embodiments, the above apparatus 1700 for image-processing further includes a comparing module and a determining module, in addition to the obtaining-information module 1710, the first clustering module 1720, the first sending module 1730, and the updating module 1740.

The comparing module is configured for comparing image-information stored in a first database with that stored in a second database and generating a new image list and an updating image list according to a comparison result, wherein the first database includes a media database of a mobile terminal, and the second database includes a face database storing face recognition results of images.

The determining module is configured for determining the image that is to be clustered according to the new image list and the updating image list.

In this embodiment, the mobile terminal compares the image-information stored in the first database with that in the second database, generates a new image list and an updating image list, and determines the image that is to be clustered. The local clustering is performed for the image that is to be clustered, which can improve the efficiency of image clustering.

In some embodiments, the comparing module includes a searching unit, a first adding unit, a determining unit, and a second adding unit.

The searching unit is configured for searching in the second database according to a storage path of the image in the first database.

The first adding unit is configured for adding the image into the new image list in response to the second database not having a corresponding image.

The determining unit is configured for determining whether a modification time of the image in the first database is consistent with that of the corresponding image in the second database in response to the second database having the corresponding image.

The determining unit is further configured for determining whether a message digest of the image in the first database is consistent with that of the corresponding image in the second database in response to the modification time of the image in the first database being inconsistent with that of the corresponding image in the second.

The second adding unit is configured for adding the image into the update image list in response to the message digest of the image in the first database is inconsistent with that of the corresponding image in the second database.

In this embodiment, the mobile terminal compares the image-information stored in the first database with that in the second database, generates a new image list and an updating image list, and then determines the image that is to be clustered. The local clustering is performed for the image that is to be clustered, which can improve the efficiency of image clustering and reduce the image processing pressure of the mobile terminal.

In some embodiments, the above apparatus 1700 for image-processing further includes an obtaining-server-list module and an obtaining-server module, in addition to the obtaining-information module 1710, the first clustering module 1720, the first sending module 1730, the updating module 1740, the comparing module, and the determining module.

The obtaining-server-list module is configured for obtaining an idle server list from a registration server every preset time period.

The obtaining-server module is configured for obtaining a first server that is idle from the idle server list in response to the idle server list being not empty.

The first sending module 1730 is further configured for uploading the image and sending an image-recognition request to the first server, wherein the image-recognition request indicates the first server to perform image-recognition for the image received by the first server and extract a feature of the image.

In this embodiment, the mobile terminal may obtain an idle server list from the registration server every preset time period, obtain an idle first server from the idle server list to which an image is uploaded, and send an image-recognition request. Thus, balanced load can be achieved for the servers, and processing pressure of the servers can be reduced.

In some embodiments, the first sending module 1730 is further configured for sending the image-clustering request to a second server in response to a completing-receiving instruction returned from the first server, wherein the completing-receiving instruction indicates that the first server has received the image, and the image-clustering request is configured to indicate the second server to cluster the feature of the image which has been uploaded to the first server via a preset model, and determine a group for the image and assign a corresponding group tag, wherein the feature of the image is uploaded from the first server to the second server.

In this embodiment, the mobile terminal sends an image-clustering request to the second server, and the image-clustering request indicates the second server to cluster the feature of the image uploaded by the mobile terminal. Thus, the stored images are intelligently clustered, and clustering efficiency of images can be improved.

In some embodiments, the first sending module 1730 includes a grouping information acquiring unit, an image-information acquiring unit, a packaging unit, and a sending unit.

The grouping information acquiring unit is configured for acquiring current image-grouping information and features of grouped images of each group corresponding to the image-grouping information.

The image-information acquiring unit is configured for acquiring second image-information of the image which has been uploaded to the first server.

The packaging unit is configured for packaging the image-grouping information, the features of the grouped images of each group, and the second image-information into an uplink data packet.

The sending unit is configured for sending the uplink data packet and the image-clustering request to the second server, wherein the image-clustering request is configured to indicate the second server to calculate a similarity between the feature of the image which has been uploaded to the first server and each of the features of the grouped images of each group via a preset model, and determine a group of the image and assign a corresponding group tag.

In this embodiment, the second server may group the uploaded images according to the existing grouping information and the features of the grouped images in each group. Thus, the clustering-result can be more accurate.

In some embodiments, the first clustering-result includes an image identifier of the image and a first group tag corresponding to the image identifier, and the second clustering-result includes the image identifier of the image and a second group tag corresponding to the image identifier.

The updating module 1740 includes a grouping type determining unit, a remaining unit, and an updating unit.

The grouping type determining unit is configured for determining a grouping type of the first group tag in response to the first group tag being inconsistent with the second group tag.

The remaining unit is configured for remaining the first group tag in response to the grouping type being manually-grouping.

The updating unit is configured for updating the first group tag to the second group tag in response to the grouping type being not manually-grouping.

In this embodiment, double-end clustering, which contains the local clustering and the server clustering, can improve the accuracy of image-clustering and the efficiency of image-clustering.

In some embodiments, the first clustering-result includes an image identifier of the image and first face-information corresponding to the image identifier, and the second clustering-result includes the image identifier of the image and second face-information corresponding to the image identifier.

The updating module 1740 further includes a comparing unit and a hiding unit, in addition to the grouping type determining unit, the remaining unit, and the updating unit.

The comparing unit is configured for comparing the first face-information with the second face-information.

The updating unit is further configured for updating the first face-information to the second face-information in response to the first face-information being less than the second face-information.

The grouping type determining unit is further configured for determining a grouping type of an extra portion of the first face-information in response to the first face-information being more than the second face-information.

The remaining unit is further configured for remaining the extra portion of the first face-information in response to the grouping type being manually-grouping.

The hiding unit is configured for hiding the extra portion of the first face-information in response to the grouping type being not manually-grouping.

In some embodiments, the first sending module 1730 is further configured for sending the extra portion of the first face-information and the image identifier to the server for storage in response to the grouping type being manually-grouping.

In this embodiment, double-end clustering, which contains the local clustering and the server clustering, can improve the accuracy of image clustering and the efficiency of image clustering.

Figure 18:
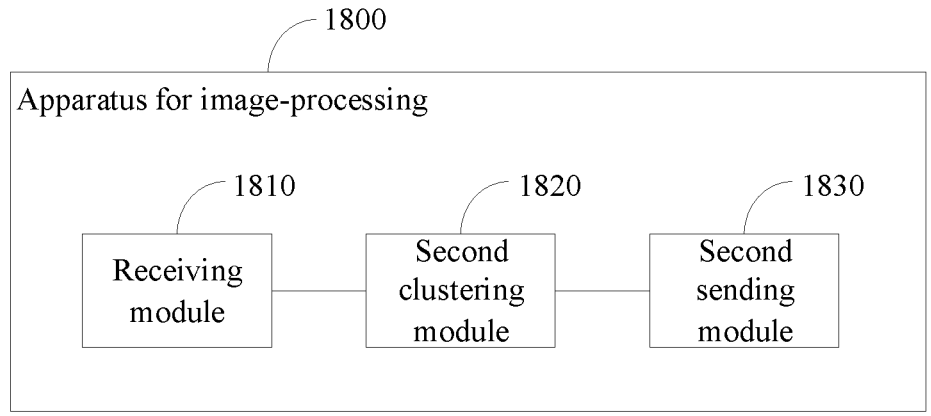
FIG. 18 is a block diagram of an apparatus for image-processing according to another some embodiments.

As shown in FIG. 18, in some embodiments, an apparatus 1800 for image-processing is provided, including a receiving module 1810, a second clustering module 1820, and a second sending module 1830.

The receiving module 1810 is configured for receiving an image-clustering request sent by a mobile terminal, wherein the image-clustering request is sent by the mobile terminal in response to a first preset condition being met.

The second clustering module 1820 is configured for clustering an image which has been uploaded by the mobile terminal and obtaining a second clustering-result in response to the image-clustering request.

The second sending module 1830 is configured for sending the second clustering-result to the mobile terminal, wherein the second clustering-result is configured for the mobile terminal to update at least one of a first clustering-result and the second clustering-result according to a preset rule, wherein the first clustering-result is obtained from the mobile terminal clustering the image that is to be clustered in response to a first preset condition being met.

In this embodiment, when the first preset condition is met, the mobile terminal performs local clustering for an image, and when the second preset condition is met, the mobile terminal performs server clustering for the image. The first clustering-result of the local clustering is combined with the second clustering-result of the server clustering. Double-end clustering, which includes the local clustering and the server clustering, improves the accuracy of image clustering and the efficiency of image clustering.

In some embodiments, the apparatus 1800 for image-processing further includes a queue adding module, a detecting module, and a merging module, in addition to the receiving module 1810, the second clustering module 1820, and the second sending module 1830.

The queue adding module is configured for adding the image-clustering request into a request queue, wherein the request queue is arranged in order of times at which image-clustering requests are sent.

The detecting module is configured for detecting whether the request queue contains another image-clustering request in response to obtaining an image-clustering request that is arranged at the frontmost of the request queue, wherein the another image-clustering request has another identifier of another mobile terminal same with that of the image-clustering request that is arranged at the frontmost of the request queue.

The merging module is configured for merging the another image-clustering request with the image-clustering request that is arranged at the frontmost of the request queue in response to the request queue contains the another image-clustering request.

In this embodiment, the server may merge image-clustering requests sent by the same mobile terminal at different times, which can improve the efficiency of clustering-image.

In some embodiments, the detecting module is further configured for detecting whether the request queue contains another image-clustering request in response to obtaining an image-clustering request that is arranged at the frontmost of the request queue, wherein the another image-clustering request has another account same with that of the image-clustering request that is arranged at the frontmost of the request queue.

The merging module is further configured for merging the another image-clustering request with the image-clustering request arranged at the frontmost of the request queue in response to the another image-clustering request existing in the request queue.

In this embodiment, the server may merge image-clustering requests sent by the same mobile terminal at different times, which can improve the efficiency of clustering-image.

Figure 19:
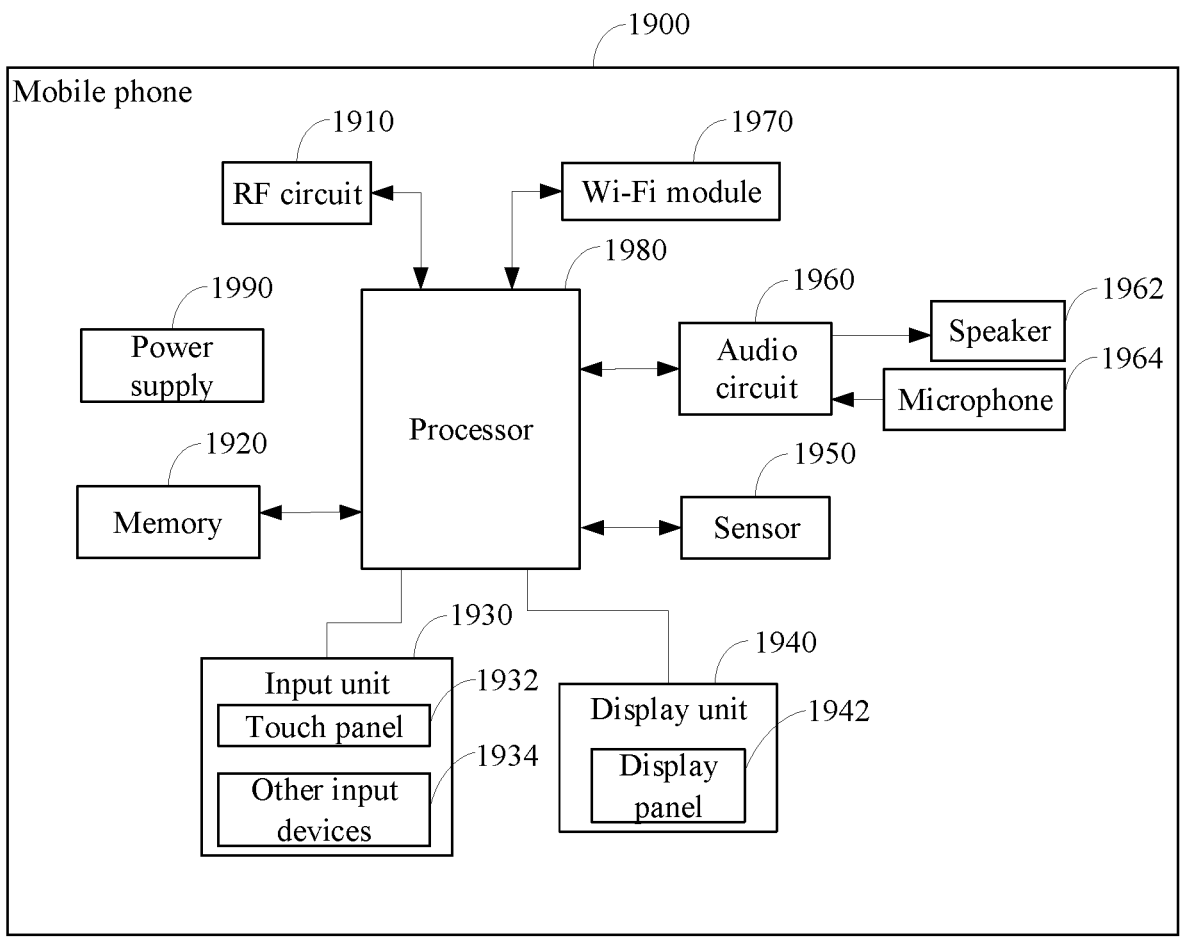
FIG. 19 is a block diagram of a mobile terminal according to some embodiments.

A mobile terminal is further provided in an embodiment of the present disclosure. As shown in FIG. 19, for the convenience of description, only the parts related to the embodiments of the present disclosure are shown. If the specific technical details are not disclosed, please refer to the method part of the embodiment of the present disclosure. The mobile terminal may be any terminal device including a mobile phone, a tablet computer, a PDA (Personal Digital Assistant), a POS (Point of Sales), an in-vehicle computer, a wearable device, and the like. The mobile terminal is used as a mobile phone as an example.

FIG. 19 is a block diagram showing a partial structure of a mobile phone related to a mobile terminal provided by an embodiment of the present disclosure. As shown in FIG. 19, the mobile phone includes a radio frequency (RF) circuit 1910, a memory 1920, an input unit 1930, a display unit 1940, a sensor 1950, an audio circuit 1960, a wireless fidelity (Wi-Fi) module 1970, a processor 1980, and a power supply 1990. It will be understood by those skilled in the art that the structure of the mobile phone as shown in FIG. 19 does not constitute a limitation to the mobile phone, and may include more or less components than those illustrated, or some components may be combined, or different component arrangements.

The RF circuit 1910 can be used for receiving and emitting information during the transmission and reception of information or during a call, and may receive downlink information of a base station for the processor 1980 to process, and may also send uplink data to the base station. Usually, the RF circuit includes, but not limited to, an antenna, at least one amplifier, a transceiver, a coupler, a Low Noise Amplifier (LNA), a duplexer and so on. In addition, the RF circuit may further communicate with other devices via wireless communication and a network. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), E-mail, Short Messaging Service (SMS), and the like.

The memory 1920 may be configured to store software programs and modules, and the processor 1980 executes various function applications and data processing of the mobile phone by running the software programs and the modules stored in the memory 1920. The memory 1920 may mainly include a program storage region and a data storage region, wherein the program storage region may store an operation system, application programs for at least one function (for example, an application for an audio playing function, an application for an image playing function, etc.), and the data storage region may store data (for example, audio data, telephone directory, etc.) created according to use of the mobile phone. In addition, the memory 1920 may include a high-speed RAM, and may further include a non-volatile memory such as at least one of a disk storage device, a flash device, or other non-volatile solid storage devices.

The input unit 1930 may be configured to receive input digital or character information and generate key signal input associated with user setting and functional control of the mobile phone 1900. Specifically, the input unit 1930 may include a touch panel 1932 and other input devices 1934. The touch panel 1932 may also be referred to as a touch screen, collect users' touch operations (such as operations on the touch panel 1932 or near the touch panel 1932 by using a user finger, a pen or any other suitable object or accessory) thereon or therenear, and drive a corresponding connection device according to a preset program. In some embodiments, the touch panel 1932 may include a touch detection device and a touch controller. The touch detection device detects a location and direction of the user's touch operation, detects signals caused by the touch operation, and transmits the signal to the touch controller. The touch controller receives touch information from the touch detection device, converts the touch information into contact coordinates and then sends to the processor 1980, and can receive and execute instructions sent by the processor 1980. In addition, various types, such as resistive-type, capacitive-type, infrared, and surface acoustic wave, can be used to implement the touch panel 1932. In addition to the touch panel 1932, the input unit 1930 may also include other input devices 1934. Specifically, other input devices 1934 may include, but is not limited to, one or more of a physical keyboard and function keys (such as volume control keys, switch keys, etc.).

The display unit 1940 can be used to display information input by the user or information provided to the user as well as various menus of the mobile phone. The display unit 1940 may include a display panel 1942. In some embodiments, a Liquid Crystal Display (LCD), an Organic Light-Emitting Diode (OLED) are used to implement the display panel 1942. In some embodiments, the touch panel 1932 may cover the display panel 1942. When the touch panel 1932 detects touch operations thereon or therenear and transmits to the processor 1980 to determine a type of the touch event. Then, the processor 1980 provides corresponding visual outputs on the display panel 1942 according to the type of the touch event. Although the touch panel 1932 and the display panel 1942 are implemented as two independent components to implement the input and output functions of the mobile phone in FIG. 19, in some embodiments, the touch panel 1932 and the display panel 1942 can be integrated to realize the input and output functions of the mobile phone.

The mobile phone 1900 may also include at least one type of sensor 1950, such as an optical sensor, a motion sensor, and other sensors. Specifically, the optical sensor may include an ambient light sensor and a proximity sensor, wherein the ambient light sensor may adjust the brightness of the display panel 1942 according to the brightness of the ambient light, and the proximity sensor may turn off the display panel 1942 and/or backlight when the mobile phone is moved to the ear. The motion sensor may include an accelerometer sensor. The accelerometer sensor can detect the magnitude of acceleration in all directions, detect the magnitude and direction of gravity when it is stationary, which can be used to identify the gesture of the mobile phone (such as horizontal and vertical screen switching, vibration recognition related functions (such as pedometer, tapping), etc. further, other sensors such as gyroscopes, barometers, hygrometers, thermometers, infrared sensors can be configured on the mobile phone.

An audio circuit 1960, a speaker 1962 and a microphone 1964 may provide an audio interface between the user and the mobile phone. The audio circuit 1960 can convert the received audio data to the electrical data and then emit to the speaker 1962. The speaker 1962 then converts to the sound signal. On the other hand, the microphone 1964 converts the collected sound signal into an electrical signal. The audio circuit 1960 receives the electrical signal and then convert it into audio data. The processor 1980 processes the audio data and then transmits another mobile phone via the RF circuit 1910, or transmits to the memory 1920 for further processing.

Wi-Fi belongs to a short-range wireless transmission technology. The mobile phone may assist the user to receive and send e-mails, webpage browsing, access to streaming media and the like by means of the Wi-Fi module 1970, which provides a wireless wideband internet access for the user.

The processor 1980 is a control center of the mobile phone, which is connected to all parts of the mobile phone by utilizing various interfaces and lines, and executes various functions and processing data of the mobile phone by running or executing the software program and/or the module stored in the memory 1920 and calling data stored in the memory 1920. Thus, it wholly monitors the mobile phone. In some embodiments, the processor 1980 may include one or more processing units. In some embodiments, the processor 1980 may be integrated with an application processor and a modulation-demodulation processor. The application processor mainly processes an operation system, a user interface, an application program and the like, and the modulation-demodulation processor mainly processes wireless communication. It will be appreciated that the above described modulation-demodulation processor may also not be integrated into the processor 1980.

The mobile phone 1900 also includes a power supply 1990 (such as a battery) that supplies power to the various components. Preferably, the power supply 1990 can be logically coupled to the processor 1980 through a power management system to manage functions such as charging, discharging, and power management through the power management system.

In some embodiments, the mobile phone 1900 may further include a camera, a Bluetooth module, and the like.

In some embodiments, when the processor 1980 included in the mobile terminal executes computer-executable instructions stored in the memory, the above method for image-processing, which is applicable to the mobile terminal, is implemented.

In some embodiments, a server is provided, including a memory and a processor, the memory storing computer executable instructions, when executed by the processor, causing the processor to perform the above method for image-processing, which is applicable to the server.

In some embodiments, a non-transitory readable storage medium is provided, storing computer-executable instructions, when are executed by one or more processors, causing the one or more processors to perform the above method for image-processing, which is applicable to the mobile terminal.

In some embodiments, a non-transitory readable storage medium is provided, storing computer-executable instructions, when are executed by one or more processors, causing the one or more processors to perform the above method for image-processing, which is applicable to the server.

A person of ordinary skill in the art can understand that all or part of the processes in the methods of the foregoing embodiments can be implemented by using a computer program to instruct related hardware. The program can be stored in a non-transitory computer-readable storage medium. When the program is executed, it may include the processes of the described-above methods of the embodiments. The storage medium may be a magnetic disk, an optical disk, a read-only memory (ROM), and the like.

Any reference to a memory, a storage, a database, or other medias herein may include non-transitory and/or transitory memory. Suitable non-transitory memory may include read-only memory (ROM), programmable ROM (PROM), electrically programmable ROM (EPROM), electrically erasable programmable ROM (EEPROM) or flash. Transitory memories can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ESDRAM), Synchlink DRAM (SLDRAM), Rambus direct RAM (RDRAM), direct memory bus dynamic RAM (DRDRAM), and memory bus dynamic RAM (RDRAM).

The technical features of the embodiments described above can be arbitrarily combined. In order to simplify the description, all possible combinations of the technical features in the above embodiments have not been described. However, as there is no contradiction in the combination of these technical features, it should be considered as the scope described in this specification.

The above-mentioned embodiments are merely illustrative of several embodiments of the present disclosure, and the description thereof is more specific and detailed, but is not to be construed as limiting the scope of the claims. It should be noted that a number of variations and modifications may be made by those skilled in the art without departing from the spirit and scope of the present disclosure. Therefore, the scope of the present disclosure should be determined by the appended claims.

What is claimed is:

1. A method for image-processing, comprising:
   obtaining first image-information of an image that is to be clustered in response to a first preset condition being met;
   clustering the image according to the first image-information and obtaining a first clustering-result;
   sending an image-clustering request to a server in response to a second preset condition being met, wherein the image-clustering request is configured to indicate the server to cluster the image which has been uploaded to the server and obtain a second clustering-result; and
   receiving the second clustering-result returned from the server and updating at least one of the first clustering-result and the second clustering-result according to a preset rule, wherein the first clustering-result comprises a first image identifier of the image, and the second clustering-result comprises a second image identifier of the image;
   the updating at least one of the first clustering-result and the second clustering-result according to the preset rule comprises:
   determining that the first image identifier is inconsistent with the second image identifier in response to the first clustering-result being inconsistent with the second clustering-result;
   updating the second clustering-result according to the first clustering-result having the first image identifier in response to the first image identifier being resulted from manually-grouping; and
   updating the first clustering-result according to the second clustering-result having the second image identifier in response to the first image identifier not being resulted from manually-grouping.

2. The method of claim 1, wherein the image is from at least one of a new image list and an updating image list, wherein the new image list comprises an image for which face-recognition is not performed, and the updating image list comprises an image for which face-recognition is performed and having a content varied after the face-recognition.

3. The method of claim 2, wherein a similarity between a first feature and a second feature of a first image being less than a preset value indicates that the first image has a content varied after the face-recognition, wherein the second feature is obtained as the first image is recognized, and the first feature is obtained as the first image is re-recognized.

4. The method of claim 2, wherein a first image is performed image-recognition, and the first image has a modification time inconsistent with that of the recognized first image and a message digest inconsistent with that of the recognized first image, and the first image is determined to have a content varied after the face-recognition.

5. The method of claim 1, further comprising:
   before the sending the image-clustering request to the server:
   obtaining an idle server list from a registration server every preset time period;
   obtaining a first server that is idle from the idle server list in response to the idle server list being not empty; and
   uploading the image and sending an image-recognition request to the first server, wherein the image-recognition request indicates the first server to perform image-recognition for the image received by the first server and extract a feature of the image.

6. The method of claim 5, wherein the sending an image-clustering request to the server comprises:
   sending the image-clustering request to a second server in response to a completing-receiving instruction returned from the first server, wherein the completing-receiving instruction indicates that the first server has received the image, and the image-clustering request is configured to indicate the second server to cluster the feature of the image which has been uploaded to the first server via a preset model, and determine a group of the image and assign a corresponding group tag, wherein the feature of the image is uploaded from the first server to the second server.

7. The method of claim 6, wherein the sending an image-clustering request to the server comprises:
   acquiring current image-grouping information and features of grouped images of each group corresponding to the image-grouping information;
   acquiring second image-information of the image which has been uploaded to the first server;
   packaging the image-grouping information, the features of the grouped images of each group, and the second image-information into an uplink data packet; and
   sending the uplink data packet and the image-clustering request to the second server, wherein the image-clustering request is configured to indicate the second server to calculate a similarity between the feature of the image which has been uploaded to the first server and each of the features of the grouped images of each group via a preset model, and determine a group of the image and assign a corresponding group tag.

8. The method of claim 1, wherein the first clustering-result comprises an image identifier of the image and a first group tag corresponding to the image identifier, and the second clustering-result comprises the image identifier of the image and a second group tag corresponding to the image identifier; and
   the updating at least one of the first clustering-result and the second clustering-result according to the preset rule comprises:
   determining a grouping type of the first group tag in response to the first group tag being inconsistent with the second group tag;
   remaining the first group tag in response to the grouping type being manually-grouping; and updating the first group tag to the second group tag in response to the grouping type being not manually-grouping.

9. The method of claim 1, wherein the first clustering-result comprises an image identifier of the image and first face-information corresponding to the image identifier, and the second clustering-result comprises the image identifier of the image and second face-information corresponding to the image identifier; and the updating at least one of the first clustering-result and the second clustering-result according to a preset rule comprises:
comparing the first face-information with the second face-information;
updating the first face-information to the second face-information in response to the first face-information being less than the second face-information;
determining a grouping type of an extra portion of the first face-information in response to the first face-information being more than the second face-information; and
remaining the extra portion of the first face-information in response to the grouping type being manually-grouping, and hiding the extra portion of the first face-information in response to the grouping type being not manually-grouping.

10. The method of claim 9, wherein the updating at least one of the first clustering-result and the second clustering-result according to a preset rule further comprises:
sending the extra portion of the first face-information and the image identifier to the server for storage in response to the grouping type being manually-grouping.

11. A method for image-processing, comprising:
receiving an image-clustering request sent by a mobile terminal, wherein the image-clustering request is sent by the mobile terminal in response to a first preset condition being met;
clustering an image which has been uploaded by the mobile terminal and obtaining a second clustering-result in response to the image-clustering request; and
sending the second clustering-result to the mobile terminal, wherein the second clustering-result is configured for the mobile terminal to update at least one of a first clustering-result and the second clustering-result according to a preset rule, wherein the first clustering-result is obtained from the mobile terminal clustering the image that is to be clustered in response to a first preset condition being met, wherein the first clustering-result comprises a first image identifier of the image, and the second clustering-result comprises a second image identifier of the image;
the updating at least one of the first clustering-result and the second clustering-result according to the preset rule comprises:
determining that the first image identifier is inconsistent with the second image identifier in response to the first clustering-result being inconsistent with the second clustering-result;
updating the second clustering-result according to the first clustering-result having the first image identifier in response to the first image identifier being resulted from manually-grouping; and
updating the first clustering-result according to the second clustering-result having the second image identifier in response to the first image identifier not being resulted from manually-grouping.

12. The method of claim 11, wherein the image-clustering request comprises an identifier of the mobile terminal and a time point at which the image-clustering request is sent; and the method further comprises:
after the receiving the image-clustering request sent by the mobile terminal:
detecting whether another image-clustering request comprising the identifier of the mobile terminal exists in a request queue, wherein the request queue is arranged in order of time points at which image-clustering requests are sent by mobile terminals; and
merging the another image-clustering request with the image-clustering request in response to the another image-clustering request existing in the request queue.

13. The method of claim 11, wherein the image-clustering request comprises account information and a time point at which the image-clustering request is sent; and
the method further comprises:
after the receiving the image-clustering request sent by the mobile terminal:
detecting whether another image-clustering request comprising the account information exists in a request queue, wherein the request queue is arranged in order of time points at which image-clustering requests are sent by mobile terminals; and
merging the another image-clustering request with the image-clustering request in response to the another image-clustering request existing in the request queue.

14. The method of claim 11, wherein the clustering an image which has been uploaded by the mobile terminal and obtaining a second clustering-result in response to the image-clustering request comprises:
obtaining a feature of the image; and
clustering the image according to the feature of the image via a preset model, determining a group of the image, and assigning a corresponding group tag.

15. A mobile terminal comprising a non-transitory memory storing executable instructions, and a processor, wherein the executable instructions, when executed, cause the processor to perform:
obtaining first image-information of an image that is to be clustered in response to a first preset condition being met;
clustering the image according to the first image-information and obtaining a first clustering-result;
sending an image-clustering request to a server in response to a second preset condition being met, wherein the image-clustering request is configured to indicate the server to cluster the image which has been uploaded to the server and obtain a second clustering-result; and
receiving the second clustering-result returned from the server and updating at least one of the first clustering-result and the second clustering-result according to a preset rule, wherein the first clustering-result comprises a first image identifier of the image, and the second clustering-result comprises a second image identifier of the image;
the updating at least one of the first clustering-result and the second clustering-result according to the preset rule comprises:
determining that the first image identifier is inconsistent with the second image identifier in response to the first clustering-result being inconsistent with the second clustering-result;

updating the second clustering-result according to the first clustering-result having the first image identifier in response to the first image identifier being resulted from manually-grouping; and updating the first clustering-result according to the second clustering-result having the second image identifier in response to the first image identifier not being resulted from manually-grouping.

16. The mobile terminal of claim 15, wherein the image is from at least one of a new image list or an updating image list, wherein the new image list comprises an image for which face recognition is not performed, and the updating image list comprises an image for which face recognition is performed and having a content varied after the face recognition.

17. The mobile terminal of claim 16, wherein a similarity between a first feature and a second feature of a first image being less than a preset value indicates that the first image has a content varied after the face recognition, wherein the second feature is obtained as the first image is recognized, and the first feature is obtained as the first image is re-recognized.

18. The mobile terminal of claim 16, wherein a first image is performed recognition, and the first image has a modification time inconsistent with that of the recognized first image and a message digest inconsistent with that of the recognized first image, and the first image is determined to have a content varied after the face recognition.

19. The mobile terminal of claim 15, wherein the image is performed image-recognition by another server to extract a feature of the image, and the image-clustering request is configured to indicate the server to cluster the image according to the feature of the image via a preset model, and determine a group of the image and assign a corresponding group tag, wherein the feature of the image is uploaded from the another server to the server.

* * * * *